US012560783B2

(12) United States Patent
Roth

(10) Patent No.: US 12,560,783 B2
(45) Date of Patent: Feb. 24, 2026

(54) FIXED FOCAL LENGTH OBJECTIVE

(71) Applicant: LEICA CAMERA AG, Wetzlar (DE)

(72) Inventor: Stefan Roth, Lahnau (DE)

(*) Notice: Subject to any disclaimer, the term of this patent is extended or adjusted under 35 U.S.C. 154(b) by 369 days.

(21) Appl. No.: 18/035,261

(22) PCT Filed: Nov. 8, 2021

(86) PCT No.: PCT/DE2021/100889

§ 371 (c)(1),
(2) Date: May 3, 2023

(87) PCT Pub. No.: WO2022/100786

PCT Pub. Date: May 19, 2022

(65) Prior Publication Data

US 2024/0012225 A1 Jan. 11, 2024

(30) Foreign Application Priority Data

Nov. 10, 2020 (DE) ......................... 102020129622.3

(51) Int. Cl.

*G02B 13/00* (2006.01)
*G02B 9/64* (2006.01)
*G02B 27/42* (2006.01)

(52) U.S. Cl.

CPC ........... *G02B 13/0055* (2013.01); *G02B 9/64* (2013.01); *G02B 13/0045* (2013.01); *G02B 27/42* (2013.01)

(58) Field of Classification Search

None
See application file for complete search history.

(56) References Cited

U.S. PATENT DOCUMENTS 8,638,506 B2 * 1/2014 Eguchi ..................... G02B 9/12 359/784
8,654,456 B2 * 2/2014 Eguchi ................... G02B 13/18 359/743
9,201,213 B2 12/2015 Ono
2004/0021956 A1 * 2/2004 Bos ........................... B60R 1/26 359/753
2006/0082882 A1 4/2006 Wang et al.
2007/0091467 A1 * 4/2007 Yasui ................ G02B 15/1421 359/754
2012/0003660 A1 1/2012 Kim
2012/0293877 A1 * 11/2012 Watanabe .............. G02B 13/02 359/773
2013/0194487 A1 8/2013 Eguchi
2015/0002939 A1 1/2015 Yasui
2016/0178875 A1 6/2016 Matsumura et al.
2020/0341238 A1 * 10/2020 Kai ........................ G02B 13/00
2022/0121004 A1 * 4/2022 Noda ................... G02B 13/006

FOREIGN PATENT DOCUMENTS

JP 2016118770 A 6/2016

* cited by examiner

*Primary Examiner* — Darryl J Collins
(74) *Attorney, Agent, or Firm* — Schlee IP International, PC; Alexander R. Schlee; Pascal A. Schlee

(57) ABSTRACT

The invention relates to a fixed focal length objective having a stationary lens group forward in the direction of light (VG), a stationary diaphragm (BL) with an adjustable aperture, a stationary rear lens group (HG) and a focussing group (MG) displaceable relative to the diaphragm along the optical axis of the objective for imaging objects at different distances onto a stationary image plane (IM), in which lens the focussing group (MG) consists of at least one lens element and a diffractive optical element (DOE) integrated into the focussing group (MG).

24 Claims, 10 Drawing Sheets

FIXED FOCAL LENGTH OBJECTIVE

CROSS-REFERENCE TO RELATED APPLICATION

This application is a national phase entry under 35 USC 371 of the international patent application PCT/DE2021/100889 filed on Nov. 8, 2021 and published under the publication number WO2022/100786, claiming the priority right from the German patent application DE 10 2020 129 622.3 filed on 10 Nov. 2020.

FIELD OF THE INVENTION

The invention relates to a fixed focal length lens.

BACKGROUND OF THE INVENTION

Such lenses are known in a variety of configurations and for different focal lengths. The overall length of the lens is not changed by displacing the focusing group. This type of focusing is therefore referred to as internal focusing, whereby the focus group can be arranged both upstream of the stop and downstream of the stop in the light direction, that is to say it is displaceable relative to the stop.

Imaging lenses with internal focusing and an individual lens as a focus element are known from document U.S. Pat. No. 9,201,213 B2.

An individual lens with a DOE for achromatic imaging with an extended depth of focus is known from document US 2006/0 082 882 A1.

A diffractive-refractive lens doublet as an achromatic imaging lens is known from document US20122002/003 660 A1.

A fixed lens element with a DOE in the front group of a lens is known from document US 2015/002 939 A1. A lens cemented member is provided for focusing purposes.

It is also known that lenses with focus elements that can be moved independently of one another require complex and therefore expensive mechanical control, in particular electromechanical control in the case of autofocus lenses. In order to ensure movement along the optical axis of the lens for both focus elements, such lenses are relatively large.

In order to reduce the overall length of the lens, the aim therefore is to combine the focus elements into a single focus group, consisting of just one lens if possible. In order to achieve approximately satisfactory color correction when using a single lens, such focus elements are usually manufactured from low-dispersion glass (phosphate glass), which makes them particularly sensitive during the machining process and vis-à-vis environmental influences. Therefore, a cemented member should often be provided in order to improve the correction of monochromatic and chromatic aberrations. Especially with lenses for large gauges such as 35 mm or medium gauge, a cemented member for focusing is heavy and can only be moved slowly, as a result of which an autofocus in particular is slow.

The imaging performance of such lenses is unsatisfactory due to the progression of the chromatic longitudinal error over the distance setting range.

SUMMARY OF THE INVENTION

The invention was therefore based on the problem of being able to better correct the chromatic longitudinal error in order to be able to minimize the progression of this aberration over the distance setting range. In addition, the weight of the focus element should be greatly reduced in order to be able to achieve a fast movement for autofocus applications.

According to an aspect of the invention, this problem is solved for a lens of the type set forth at the outset by a fixed focal length lens comprising, in the light direction, a fixed front lens group (VG), a fixed stop (BL) with an adjustable aperture. a fixed back lens group (HG), and a focusing group (MG) that can be displaced relative to the stop along the optical axis of the lens for the purpose of imaging differently distant objects on a fixed image plane (IM). wherein the focusing group (MG) consists of at least a lens element and a diffractive optical element (DOE) integrated into the focusing group (MG); and the focusing group (MG) consists of a maximum of two lens elements and has a positive optical power I'MG overall.

DETAILED DESCRIPTION OF THE INVENTION

In this case, the focusing group that is movable for setting the distance is manufactured from at least one lens element, but no more than two jointly moved lens elements, each with positive or negative optical power and optionally a diffractive property on one side and a refractive property on one side produced by a spherical or aspherical surface, with the focusing group overall having a positive optical power and the ratio of the optical power $f'_{DOE}$ of the diffractive optical element to the total optical power $f'_{ges}$ of the lens being at least 14.9 and at most 45.4.

The focusing group that is movable for setting the distance is arranged in a vicinity of the stop and is displaced counter to the light direction for focusing from an infinity setting, that is to say the lens is focused on an infinitely distant object point, to focusing in the close-up range. In this case, the focusing group moves away from the back lens group toward the front lens group. The vicinity of the stop is defined as the region located directly in front of or behind the stop, with no further optical element, or at most one further optical element, being arranged between stop and focusing member.

Further embodiments of the invention also emerge from the features of the description of the drawing.

With regard to the solution features specified in the claims, it should be noted that modern optics design usually uses automatic correction programs, such as "Code V" from Synopsys and "Zemax" from ZEMAX LLC. which are able to calculate proposals for functional lens systems with a correction state optimized for a specific task from given lens sequences and optical power distributions. On account of targeted changes to the specified parameters by the optics designer, the automatically achieved state of correction is further improved in each case.

Using the features of claim 1, the construction data for radii, lens element thicknesses, lens element spacings, refractive indices, and Abbe numbers of the optical glasses to be used can already be obtained in this way. If the features specified in the dependent claims and the description of the figures are taken into account, the construction parameters can be improved incrementally in a targeted manner.

The design and calculation of aspherical surfaces on optical lens elements as well as the design and calculation of diffractive elements with regard to their influence on the imaging beam path in optical systems are known per se to those skilled in the art of optics.

For example, aspherical surfaces are described using a conic representation of the aspherical lens using the formula $$z(h)=\frac{h^2/r}{1+\sqrt{1-(1+k)\cdot(h/r)^2}}+a2\cdot h^4+a4\cdot h^6+\ldots+a6\cdot h^{12}$$

where the assumption is made that the optical axis lies in the z-direction and z(h) denotes the sagittal height parallel at a distance h perpendicular to the optical axis. The asphere coefficients a2, a4, . . . an describe the deviation of the surface from the axisymmetric square surface, which is given by r, the radius of curvature of the spherical surface, and k, the conic constant.

The design and calculation of a diffractive element is described by the phase profile and the focal length of the diffractive surface in relation to the spectral line with the wavelength of 546.0740 nm, that is to say the Fraunhofer e-line.

The formula for the phase profile of the diffractive surface is:

$$\psi_{doe}(h)=C1\cdot h^2+C2\cdot h^4+\ldots+C6\cdot h^{12})$$

where $\psi_{doe}$ corresponds to the phase profile at a distance h perpendicular to the optical axis and C1, C2, C3, . . . Cn correspond to the phase coefficients.

The formula for the focal length $f'_{doe}$ of the diffractive surface with respect to the e-line is $$f'_{doe}=\frac{\lambda_{constr}}{2\cdot\lambda_e\cdot C1\cdot m}$$

where $\lambda_{constr}$ corresponds to the construction wavelength, which, with 546.074 nm, was chosen to be equal to the spectral e-line in the following examples. The order of diffraction m is 1 in the examples.

The paraxial imaging scale β' is defined as $$\beta'=\frac{n\cdot u}{n'\cdot u'}$$

where n corresponds to the refractive index upstream of the optical element and n' corresponds to the refractive index downstream thereof. By definition, u corresponds to the paraxial marginal ray upstream of the optical element and u' corresponds to the paraxial marginal ray downstream thereof.

$$v_e=\frac{n_e-1}{n_{F'}-n_{C'}}$$

The Abbe number ve with respect to the e-line is defined as for spectral lines C'=643.8469 nm, e=546.0740 nm, and F'=479.9914 nm. The use of diffractive optical elements (DOE) in photographic lenses is likewise known per se, with the diffractive optical elements being applied to a lens element, for example as photolithographically produced microstructures (diffraction structures). The general aim is to minimize chromatic aberrations while at the same time lightening the construction of the lens. Concentration on the construction of a focusing element in a lens is unknown. However, this discovery plays a key role for the construction of lighter lenses overall.

An undesired relatively large chromatic magnification difference that may occur in lens variants designed according to the invention can be corrected in lens digital camera arrangements according to the invention with the aid of software algorithms after the image has been recorded in the camera. A correction within the scope of post-processing the image data on the computer is also possible.

Figure 1:
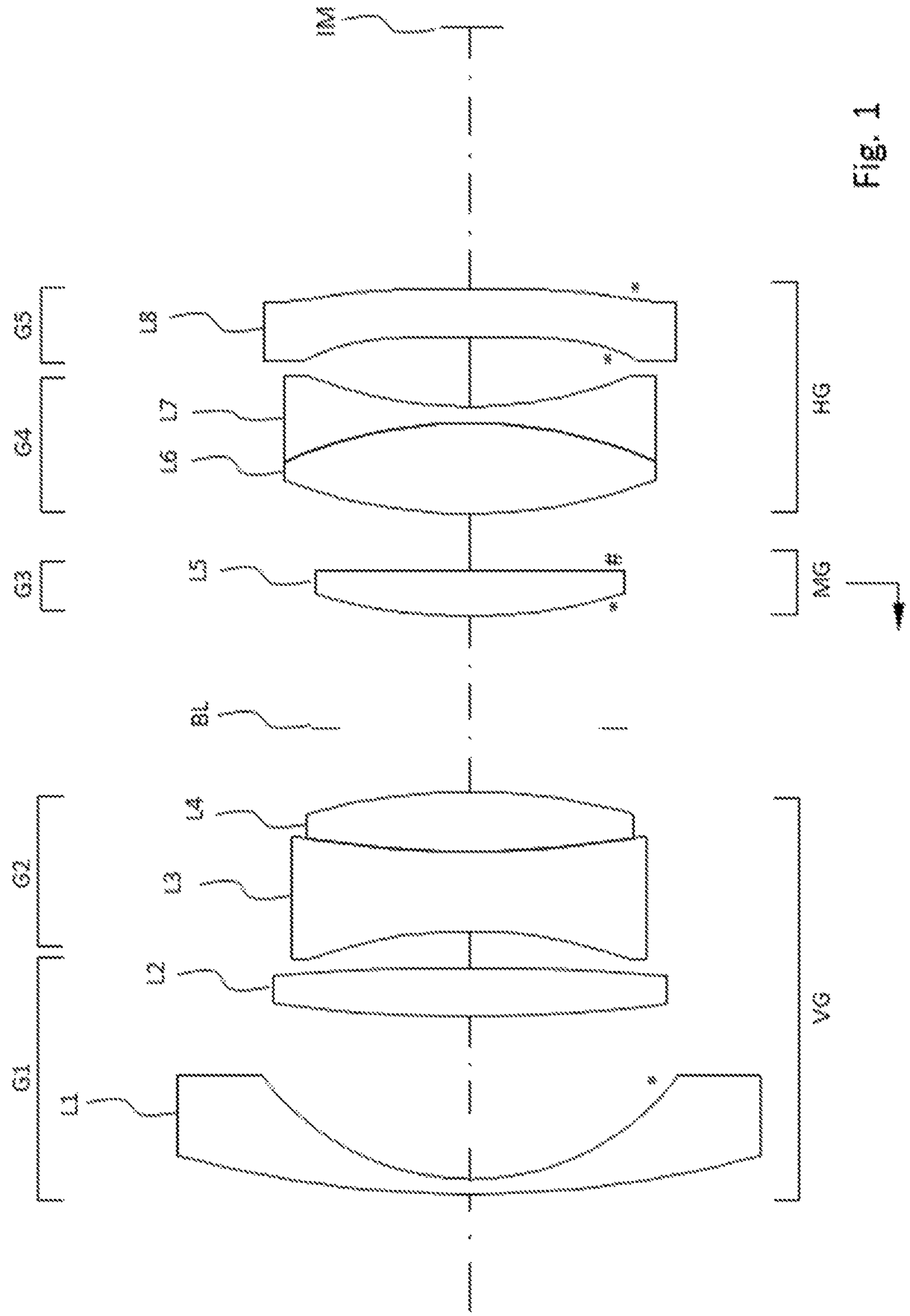
FIG. 1 schematically shows a first embodiment of a fixed focal length lens according to the invention.

Exemplary embodiments of the invention are depicted schematically in the drawing as lens sections and are described in more detail with reference to the figures.

In the lens sections, the lens surfaces marked with an * are generally aspherically curved. The surfaces marked with # have a diffractive optical power.

The possibilities for solving the problem according to the invention are not limited to the described embodiments. The embodiments are therefore only exemplary and depicted schematically in the drawings. The same reference signs in the individual figures denote the same or functionally identical elements or elements that correspond in their functions.

According to the definition in the description, disclosed further lens parameters and the patent claims, the depicted lens examples of constant overall length with internal focusing consist of a front lens group VG, a fixed stop BL with an adjustable aperture, a fixed back lens group HG, and a middle group MG as focusing group that can be displaced relative to the stop along the optical axis of the lens. In all figures of the drawing, the focusing group MG is arranged at the infinity distance setting and is mounted to be displaceable in the indicated direction of the arrow counter to the light direction for the purpose of focusing on a near object point. By definition, the individual single lenses L1, L2, L3, . . . are numbered in the light direction. Individual single lenses can be combined into groups G1, G2, G3, . . . .

Figure 2:
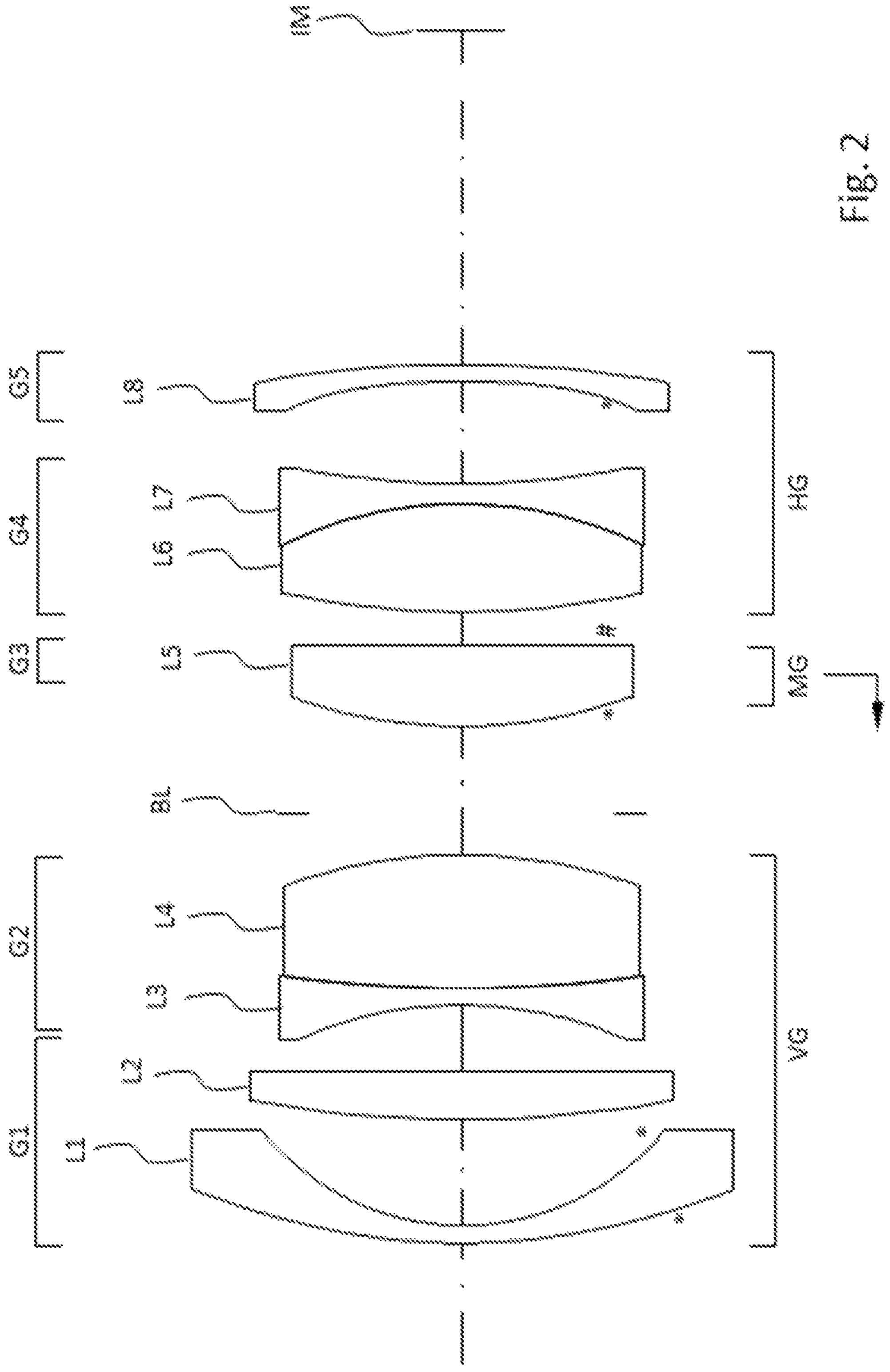
FIG. 2 schematically shows a second embodiment of a fixed focal length lens according to the invention.
Figure 3:
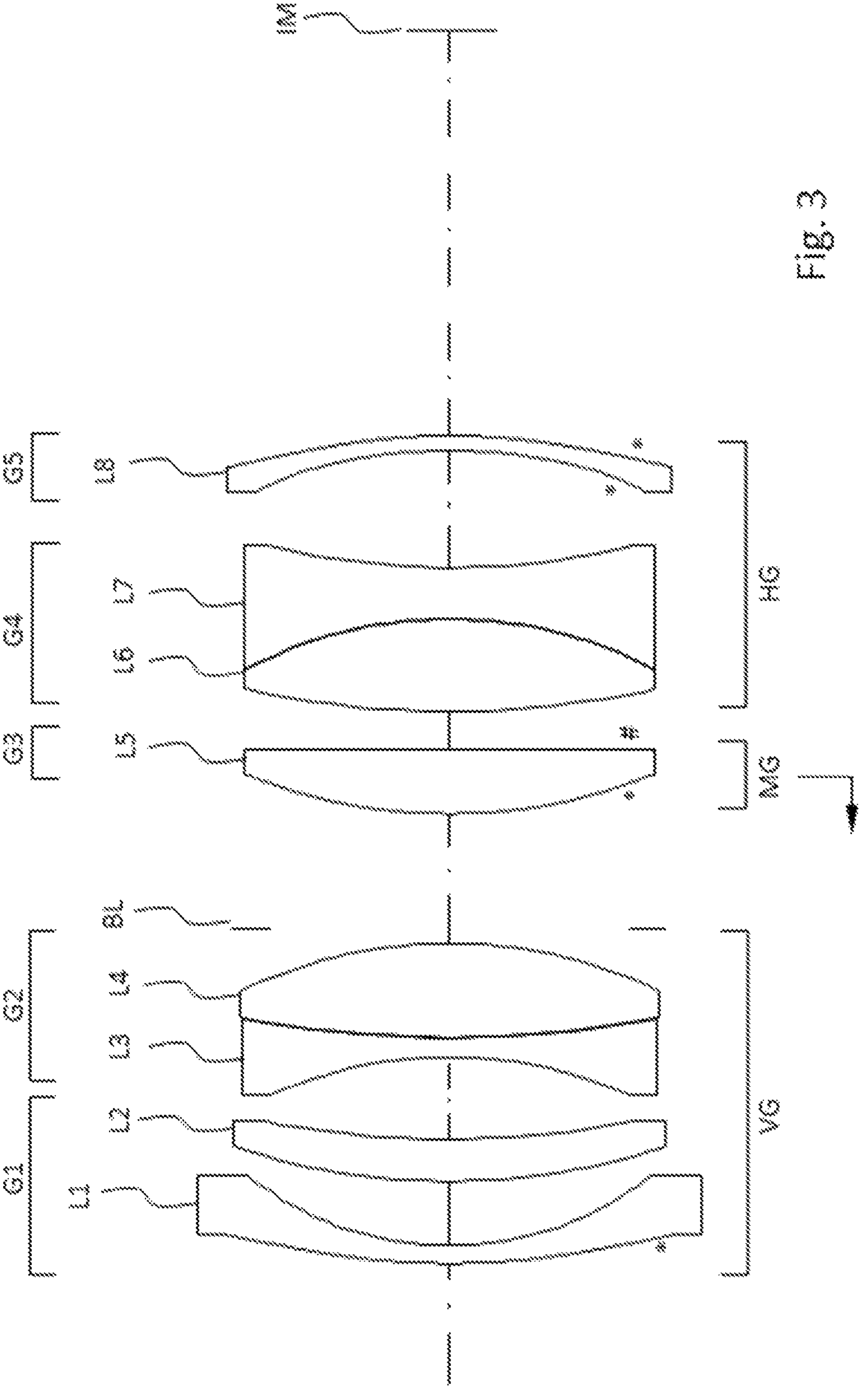
FIG. 3 schematically shows a third embodiment of a fixed focal length lens according to the invention.

The exemplary embodiments of a fixed focal length lens of constant overall length shown in FIGS. 1 to 3 consist of three optical assemblies, a front group VG, a middle group MG, and a back group HG, each with positive total optical power, which are arranged upstream of an image position IM as seen in the light direction.

For a standardized representation, the following numerical values are given by focal length ratios.

The focal length $f'_{VG}$ of the front group VG is defined by the range $$+7.0\leq f'_{VG}/f'_{ges}\leq+25.7,$$

the focal length $f'_{MG}$ of the middle group is in the range $$+1.6 \leq f'_{MG}/f'_{ges} \leq +3.0,$$

and the focal length $f'_{HG}$ of the back group HG is in the range of $$+3.1 \leq f'_{HG}/f'_{ges} \leq +5.0.$$

The front group VG consists of two subgroups G1 and G2, the middle group MG consists of an optical element G3, and the back group HG has two subgroups G4 and G5. An aperture stop BL with a changeable aperture diameter is arranged between the front group VG and the middle group MG. By definition, the middle group MG is arranged in the vicinity of the stop, that is to say no further optical element is provided between the aperture stop BL and the middle group MG. The middle group MG consists of an optical element G3 and is mounted to be movable, in the direction toward the aperture stop BL, for focusing purposes from the depicted infinity position to a near-focus region counter to the light direction (that is to say in the direction of the arrow shown).

Advantageously, the optical power $f'_{MG}$ of the middle group MG should, firstly, not be chosen too small because otherwise the focus travel, from focusing at infinity to focusing close-up, will be longer but, secondly, the optical power must not be chosen too large as the volume of the lens will otherwise increase. Both effects have a disadvantageous effect and would result in the lens focusing too slowly and no longer being suitable for autofocus applications.

According to the invention, therefore, the focal length $f'_{MG}$ of the middle group MG should be chosen in the following range:

$$+1.6 \leq f'_{MG}/f'_{ges} \leq +3.0.$$

In particularly advantageous fashion, the optical element G3 in the middle group MG is designed as a single lens L5 with a surface of diffractive optical power f DOE within the limits:

$$+33.6 \leq f'_{DOE}/f'_{ges} \leq +45.4$$

in order to minimize the chromatic aberration over the entire distance setting range of the lens.

According to the invention, the simple manufacture of the diffractive structure required for the diffractive optical power is made possible on a flat, at least only slightly curved surface. Advantageously, therefore, the vertex radius roof of the diffractive surface of the single lens L5 in the middle group (MG) is planar within the following limits:

$$-0.1255 \leq f'_{MG}/r_{DOE} \leq +0.1388.$$

Compensation for the monochromatic aberrations over the distance setting range is advantageously ensured if the other, aperture stop BL facing surface of the single lens L5 has a positive optical power and is further advantageously designed to be aspherical.

The subgroup G1 of the front group VG consists of two members L1 and L2 and has an overall negative optical power. The focal length F'G1 of the subgroup G1 is defined by the following range:

$$f'_{G1}/f'_{ges} \leq -3.7.$$

The at least one convex-concave first single lens L1 with negative optical power is meniscus-shaped and arranged with its concave side toward a convex side of the at least one single lens L2 with positive optical power.

The subgroup G2 of the front group VG has two members L3 and L4 with an overall positive optical power. The at least one first single lens L3 with negative optical power is of biconcave form and arranged with its concave first side toward the single lens L2 in the subgroup G2. The second element of subgroup G2 has at least one single lens L4 of positive optical power. In the exemplary embodiment, the members L3 and L4 are designed as individual lens elements and combined as a doublet.

The features of the subgroups G1 and G2 advantageously bring about a compensation of the monochromatic aberrations between the image center and the image field.

The subgroup G4 of the back group HG has two members L6 and L7 with an overall positive optical power. It consists of at least one biconvex single lens L6 with positive optical power and at least one biconcave single lens L7 with negative optical power. L6 is arranged with its convex first side facing the middle group MG. In the exemplary embodiment, the members L6 and L7 are designed as individual lens elements and combined as a doublet.

The subgroup G5 of the back group HG has negative or positive total optical power and consists of at least one last single lens L8 whose first surface is of concave form and arranged facing the subgroup G4. In this case, the focal length $f'_{G5}$ of subgroup G5 is defined by the range $-0.1 \leq f'_{ges}/f'_{G5} \leq +0.1$.

Advantageously, the features of the subgroups G4 and G5 can be used to bring about a minimization of the coma, the astigmatic difference and the distortion in the image field.

Advantageously, the refractive index n of at least one of the single lenses of positive optical power in the front group VG has a value greater than or equal to 1.85 ($n \geq 1.85$); the Petzval sum is minimized in this way.

Further advantageously, the refractive index n of at least one of the single lenses of positive optical power in the back group HG is likewise chosen to be greater than or equal to 1.85 ($n \geq 1.85$) in order to further minimize the Petzval sum.

An advantageously chosen refractive index n of less than or equal to 1.60 ($n \leq 1.60$) of the first single lens of negative optical power in the front group VG also contributes to minimizing the Petzval sum.

To compensate for the monochromatic aberrations in the image field, the first single lens L1 in the front group VG is formed with aspherical surfaces on one or both sides.

Advantageously, the last single lens L8 in the back group (HG) is formed with aspherical surfaces on one or both sides in order to achieve further compensation for the monochromatic aberrations in the image field.

A light focusing group MG is advantageous for a high focusing speed. In this case, a ratio of the volume V of the focusing group MG to the image circle diameter Bd in the imaging plane, raised to the third power, of less than 0.1 ($V/Bd^3 < 0.1$) was found to be particularly advantageous. In this way, the focusing group is light and allows for quick focusing. At the same time, a lightweight focusing group has the advantage of low power consumption in autofocus applications and enables quiet focusing. The image circle diameter Bd is also known to those skilled in the art as the image diagonal of a digital image recording sensor Bs and is described in more detail with reference to FIG. 10.

Further advantageously, the ratio of the optical overall length SO' of the lens to the image circle diameter Bd in the imaging plane IM is less than or equal to 2.0 ($SO'/Bd \leq 2.0$) for a compact design, with the optical overall length SO' being defined as the distance from the lens vertex of the first lens surface of the single lens L1 on the optical axis in the light direction to the image position IM.

A lens constructed using the features described above advantageously has a half object angle w of greater than or equal to 31° ($w \geq 31°$).

The lens has an aperture ratio F/# of at least 1.7 and at most 2.5, it is advantageously in the range between 1.7 and 2.5 ($1.7 \leq F/\# \leq 2.5$).

The lens shown in FIG. 1 has a compact design, with the ratio of the optical overall length SO' of the lens to the image circle diameter Bd in the imaging plane IM being 1.73 (SO'/Bd=1.73), the half object angle w equaling 42° (w=42°), and the aperture ratio F/# being 2.0 (F/#=2.0).

In this lens, the previously described subgroups G1 to G5 consist of single lenses L1 to L8, which, as seen in the light direction, have the optical power sequence −+−+++−−.

The focal length $f'_{VG}$ of the front group VG is particularly advantageously defined by $$f'_{VG}/f'_{ges}=+7.7,$$

the focal length $f'_{MG}$ of the middle group MG is particularly advantageously defined by $$f'_{MG}/f'_{ges}=+2.8,$$

and the focal length $f'_{HG}$ of the back group HG is particularly advantageously defined by $$f'_{HG}/f'_{ges}=+3.4,$$

in each case related to a given total focal length $f'_{ges}$ of the lens.

The single lens L5 of the optical element G3 in the middle group MG arranged downstream of the stop BL is in the form of a convex lens with an aspherical first surface and a planar second surface, as seen in the light direction. The planar second surface has a diffractive optical power f DOE of $$f'_{DOE}/f'_{ges}=+38.9,$$

which particularly advantageously brings about the minimization of the chromatic aberration over the entire distance setting range of the lens. The planar second surface is particularly suitable for the simple manufacture of a diffractive structure and the aspherical first surface compensates for the monochromatic aberrations over the distance setting range.

The subgroup G1 of the front group VG consists of two single lenses L1 and L2 and has an overall focal length $F'_{G1}$ of $$f'_{G1}/f'_{ges}=-485.6.$$

The first single lens L1 has a convex-concave shape with negative optical power and is meniscus-shaped with a spherically curved convex side and an aspherically curved concave side.

The subgroup G2 of the front group VG advantageously has an overall focal length $f'_{G2}$ of $$f'_{G2}/f'_{ges}=+9.5.$$

With the focal lengths defined in this way for the subgroups G1 and G2, compensation for the monochromatic aberrations between the image center and the image field is ensured.

The subgroup G4 of the back group HG consists of a biconvex single lens L6 and a biconcave single lens L7, both are combined in a doublet, with a total focal length $f'_{G4}$ of $$f'_{G4}/f'_{ges}=+3.6.$$

Advantageously, the subgroup G5 of the back group HG has an overall focal length $f'_{G5}$ of $$f'_{ges}/f'_{G5}=+0.01$$

and is designed as an individual lens L8 with a concavely convex surface that is shaped aspherically on both sides.

By way of the focal lengths defined in this way for the subgroups G4 and G5, the coma, the astigmatic difference, and the distortion in the image field are further minimized.

Advantageously, the single lens L2 in the front group VG has a refractive index n of 2.01 (n=2.01), the single lens L6 in the back group HG has a refractive index of 2.01 (n=2.01), and the single lens L1 in the front group VG has a refractive index of 1.49 (n=1.49) in order to further minimize the Petzval sum.

A ratio of the volume V of the focusing group MG to the image circle diameter Bd in the imaging plane, raised to the third power, of 0.01 ($V/Bd^3=0.01$) was found to be particularly advantageous for high focusing speeds in autofocus applications.

For the exemplary embodiment in FIG. 1, mechanical construction data and optical parameters for the respective lens elements are given in the following tables.

The construction data are normalized to a total focal length $f'_{ges}=1$ mm and can be scaled in a known way, for example to the total focal length $f'_{ges}=24$ mm for the 35 mm range.

Here, the data refer to the surfaces of the lens elements, numbered in ascending order in the light direction. The first surface 1 describes the air-glass transition at single lens L1 and the last surface 15 the glass-air transition at single lens L8. The aperture stop BL is indicated as a planar surface 8.

The vertex radius r, that is to say the radius on the optical axis, is specified for each surface. The surface type is given in the third column. For example, K02 labels the second surface as an aspherically curved surface and H10 labels the tenth surface as a diffractive surface. dM denotes the center thickness of the respective single lens or the distance to an adjacent surface at the vertex. For the middle group MG, which is designed to be displaceable for focusing purposes, the value dM is given as the distance in the focusing position for infinity, and V01 and V02 label the distances that are variable with the focusing.

ne denotes the refractive index for the Fraunhofer e-line (wavelength 546.0740 nm) and ve the Abbe number for the Fraunhofer e-line.

The assignment of the numbered surfaces to the respective single lenses L1-L8, the subgroups G1-G5, and the groups VG, MG and HG is given in the last three columns:

| Surface | r [mm] | | $d_M$ [mm] | ne | ve | Lens | Subgroup | Group |
|---|---|---|---|---|---|---|---|---|
| 1 | 2.755 | | 0.04 | 1.489 | 70 | L1 | G1 | VG |
| 2 | 0.674 | K02 | 0.44 | | | | | |
| 3 | 3.841 | | 0.13 | 2.009 | 29 | L2 | | |
| 4 | −5.767 | | 0.10 | | | | | |
| 5 | −1.208 | | 0.21 | 1.734 | 28 | L3/4 | G2 | |
| 6 | 2.465 | | 0.16 | 1.888 | 41 | | | |
| 7 | −1.543 | | 0.17 | | | | | |

-continued

| Surface | r [mm] | | $d_M$ [mm] | | ne | ve | Lens | Subgroup | Group |
|---|---|---|---|---|---|---|---|---|---|
| 8 | Planar | Stop | 0.30 | V01 | | | | | |
| 9 | 1.463 | K09 | 0.13 | | 1.489 | 70 | L5 | G3 | MG |
| 10 | Planar | H10 | 0.15 | V02 | | | | | |
| 11 | 1.333 | | 0.25 | | 2.009 | 29 | L6/7 | G4 | HG |
| 12 | −1.148 | | 0.04 | | 1.816 | 23 | | | |
| 13 | 1.144 | | 0.19 | | | | | | |
| 14 | −17.292 | K14 | 0.13 | | 1.605 | 65 | L8 | G5 | |
| 15 | −12.300 | K15 | 0.71 | | | | | | |

The table below shows the conic constant k and the aspherical coefficients a2 to a6 for the aspherical surfaces labeled with K above in relation to the surface type and the phase coefficient C1 for the diffractive surface marked with H, in exponential representation:

| | k | a2 | a3 | a4 |
|---|---|---|---|---|
| K02 | 0.000000E+00 | 4.110307E−02 | 1.348000E−02 | −8.416139E−01 |
| K09 | 0.000000E+00 | 1.637468E−01 | 2.273866E−02 | 3.578858E−01 |
| K14 | 0.000000E+00 | −1.623462E+00 | −1.515010E+00 | 7.071063E+00 |
| K15 | 0.000000E+00 | −8.010530E−01 | 1.747392E−01 | 5.955908E+00 |

| | a5 | a6 |
|---|---|---|
| K02 | 4.158298E+00 | −9.074513E+00 |
| K09 | | |
| K14 | 1.280264E+00 | −2.239893E+01 |
| K15 | 1.235468E+01 | −4.160263E+01 |

| | C1 |
|---|---|
| H10 | −1.284465E−02 |

The lens of compact design shown in FIG. 2 has a ratio of the optical overall length SO' of the lens to the image circle diameter Bd in the imaging plane IM of 1.73 (SO'/Bd=1.73), the half object angle w equals 38° (w=38°), and the aperture ratio F/# is 2.0 (F/#=2.0).

In this lens, the previously described subgroups G1 to G5 consist of single lenses L1 to L8, which, as seen in the light direction, have the optical power sequence −+−+++−−. The focal length $f'_{VG}$ of the front group VG is particularly advantageously defined by $$f'_{VG}/f'_{ges} \leq +19.4,$$

the focal length $f'_{MG}$ of the middle group MG is particularly advantageously defined by $$f'_{MG}/f'_{ges}=+2.2,$$

and the focal length $f'_{HG}$ of the back group HG is particularly advantageously defined by $$f'_{HG}/f'_{ges}=+3.8,$$

in each case related to a given total focal length $f'_{ges}$ of the lens.

The single lens L5 of the optical element G3 in the middle group MG arranged downstream of the stop BL is in the form of a convex lens with an aspherical first surface and a planar second surface, as seen in the light direction. The planar second surface has a diffractive optical power $f'_{DOE}$ of $$f'_{DOE}/f'_{ges}=+40.3$$

which particularly advantageously brings about the minimization of the chromatic aberration over the entire distance setting range of the lens. The planar second surface is particularly suitable for the simple manufacture of a diffractive structure and the aspherical first surface compensates for the monochromatic aberrations over the distance setting range.

The subgroup G1 of the front group VG consists of two single lenses L1 and L2 and has an overall focal length $F'_{G1}$ of $$f'_{G1}/f'_{ges}=-7.2.$$

The first single lens L1 has a convex-concave shape with negative optical power and is meniscus-shaped with an aspherically curved convex side and an aspherically curved concave side.

The subgroup G2 of the front group VG advantageously has an overall focal length $f'_{G2}$ of $$f'_{G2}/f'_{ges}=+6.7.$$

With the focal lengths defined thus for the subgroups G1 and G2, compensation for the monochromatic aberrations between the image center and the image field is ensured.

The subgroup G4 of the back group HG consists of a biconvex single lens L6 and a biconcave single lens L7, both are combined in a doublet, with a total focal length $f'_{G4}$ of $$f'_{G4}/f'_{ges}=+3.0.$$

Advantageously, the subgroup G5 of the back group HG has an overall focal length $f'_{G5}$ of $$f'_{ges}/f'_{G5}=-0.09$$

and is designed as an individual lens L8 with an aspherically concave and spherically convex surface.

By way of the focal lengths defined in this way for the subgroups G4 and G5, the coma, the astigmatic difference, and the distortion in the image field are further minimized.

Advantageously, the single lens L2 in the front group VG has a refractive index n of 2.01 (n=2.01), the single lens L6 in the back group HG has a refractive index of 2.01 (n=2.01), and the single lens L1 in the front group VG has a refractive index of 1.49 (n=1.49) in order to further minimize the Petzval sum.

A ratio of the volume V of the focusing group MG to the image circle diameter Bd in the imaging plane, raised to the third power, of 0.02 ($V/Bd^3=0.02$) was found to be particularly advantageous for high focusing speeds in autofocus applications.

For the exemplary embodiment in FIG. 2, mechanical construction data and optical parameters for the respective lens elements are given in the following tables.

The construction data are normalized to a total focal length $f'_{ges}=1$ mm and can be scaled in a known way, for example to the total focal length $f'_{ges}=28$ mm for the 35 mm range.

Here, the data refer to the surfaces of the lens elements, numbered in ascending order in the light direction. The first surface 1 describes the air-glass transition at single lens L1 and the last surface 15 the glass-air transition at single lens L8. The aperture stop BL is indicated as a planar surface 8.

The vertex radius r, that is to say the radius on the optical axis, is specified for each surface. The surface type is given in the third column. For example, K01 labels the first surface as an aspherically curved surface and H10 labels the tenth surface as a diffractive surface. dM denotes the center thickness of the respective single lens or the distance to an adjacent surface at the vertex. For the middle group MG, which is designed to be displaceable for focusing purposes, the value dM is given as the distance in the focusing position for infinity, and V01 and V02 label the distances that are variable with the focusing.

ne denotes the refractive index for the Fraunhofer e-line (wavelength 546.0740 nm) and ve the Abbe number for the Fraunhofer e-line.

The assignment of the numbered surfaces to the respective single lenses L1-L8, the subgroups G1-G5, and the groups VG, MG and HG is given in the last three columns:

The lens shown in FIG. 3 has a compact design, with the ratio of the optical overall length SO' of the lens to the image circle diameter Bd in the imaging plane IM being 1.73 (SO'/Bd=1.73), the half object angle w equaling 32° (w=32°), and the aperture ratio F/# being 2.0 (F/#=2.0).

In this lens, the previously described subgroups G1 to G5 consist of single lenses L1 to L8, which, as seen in the light direction, have the optical power sequence −+−+++−−. The focal length $f'_{VG}$ of the front group VG is particularly advantageously defined by $$f'_{VG}/f'_{ges} \leq +23.3,$$

the focal length $f'_{MG}$ of the middle group MG is particularly advantageously defined by $$f'_{MG}/f'_{ges} = +1.8,$$

and the focal length $f'_{HG}$ of the back group HG is particularly advantageously defined by $$f'_{HG}/f'_{ges} = +4.5,$$

in each case related to a given total focal length $f'_{ges}$ of the lens.

| Surface | r [mm] | | $d_M$ [mm] | | ne | ve | Lens | Subgroup | Group |
|---|---|---|---|---|---|---|---|---|---|
| 1 | 1.370 | K01 | 0.04 | | 1.489 | 70 | L1 | G1 | VG |
| 2 | 0.542 | K02 | 0.24 | | | | | | |
| 3 | 2.501 | | 0.10 | | 2.009 | 29 | L2 | | |
| 4 | 21.684 | | 0.15 | | | | | | |
| 5 | −0.835 | | 0.04 | | 1.704 | 30 | L3/4 | G2 | |
| 6 | 2.556 | | 0.29 | | 1.888 | 41 | | | |
| 7 | −1.101 | | 0.09 | | | | | | |
| 8 | Planar | Stop | 0.19 | V01 | | | | | |
| 9 | 1.139 | K09 | 0.18 | | 1.489 | 70 | L5 | G3 | MG |
| 10 | Planar | H10 | 0.07 | V02 | | | | | |
| 11 | 1.828 | | 0.24 | | 2.009 | 29 | L6/7 | G4 | HG |
| 12 | −0.856 | | 0.04 | | 1.816 | 23 | | | |
| 13 | 1.765 | | 0.23 | | | | | | |
| 14 | −1.780 | K14 | 0.04 | | 1.605 | 65 | L8 | G5 | |
| 15 | −2.318 | | 0.74 | | | | | | |

The table below shows the conic constant k and the aspherical coefficients a2 to a6 for the aspherical surfaces labeled with K above in relation to the surface type and the phase coefficient C1 for the diffractive surface marked with H, in exponential representation:

| | k | a2 | a3 | a4 |
|---|---|---|---|---|
| K01 | 0.000000E+00 | −1.182192E−01 | | |
| K02 | 0.000000E+00 | −1.010348E−01 | −4.142801E−02 | −2.996270E+00 |
| K10 | 0.000000E+00 | 1.620087E−01 | 2.928861E−01 | −7.015415E−01 |
| K14 | 0.000000E+00 | −1.010069E+00 | −4.913396E−01 | −1.333052E+01 |

| | a5 | a6 |
|---|---|---|
| K01 | | |
| K02 | 1.143157E+01 | −2.860168E+01 |
| K10 | | |
| K14 | 4.304875E+01 | −1.675027E+02 |

| | C1 |
|---|---|
| H10 | −1.239939E−02 |

The single lens L5 of the optical element G3 in the middle group MG arranged downstream of the stop BL is in the form of a convex lens with an aspherical first surface and a planar second surface, as seen in the light direction. The planar second surface has a diffractive optical power $f'_{DOE}$ of $$f'_{DOE}/f'_{ges} = +40.9$$

which particularly advantageously brings about the minimization of the chromatic aberration over the entire distance setting range of the lens. The planar second surface is particularly suitable for the simple manufacture of a diffractive structure and the aspherical first surface compensates for the monochromatic aberrations over the distance setting range.

The subgroup G1 of the front group VG consists of two single lenses L1 and L2 and has an overall focal length $F'_{G1}$ of $$f'_{G1}/f'_{ges} = -4.1.$$

The first single lens L1 has a convex-concave shape with negative optical power and is meniscus-shaped with an aspherically curved convex side and a spherically curved concave side.

The subgroup G2 of the front group VG advantageously has an overall focal length $f'_{G2}$ of $$f'_{G2}/f'_{ges}=+4.2.$$

With the focal lengths defined thus for the subgroups G1 and G2, compensation for the monochromatic aberrations between the image center and the image field is ensured.

The subgroup G4 of the back group HG consists of a biconvex single lens L6 and a biconcave single lens L7, both are combined in a doublet, with a total focal length $f'_{G4}$ of $$f'_{G4}/f'_{ges}=+3.8.$$

Advantageously, the subgroup G5 of the back group HG has an overall focal length $f'_{G5}$ of $$f'_{G5}/f'_{ges}=-0.04.$$

and is designed as an individual lens L8 with a concavely convex surface that is shaped aspherically on both sides.

By way of the focal lengths defined in this way for the subgroups G4 and G5, the coma, the astigmatic difference, and the distortion in the image field are further minimized.

Advantageously, the single lens L2 in the front group VG has a refractive index n of 2.06 (n=2.06), the single lens L6 in the back group HG has a refractive index of 1.91 (n=1.91), and the single lens L1 in the front group VG has a refractive index of 1.49 (n=1.49) in order to further minimize the Petzval sum.

A ratio of the volume V of the focusing group MG to the image circle diameter Bd in the imaging plane, raised to the third power, of 0.02 ($V/Bd^3=0.02$) was found to be particularly advantageous for high focusing speeds in autofocus applications.

For the exemplary embodiment in FIG. 3, mechanical construction data and optical parameters for the respective lens elements are given in the following tables.

The construction data are normalized to a total focal length $f'_{ges}=1$ mm and can be scaled in a known way, for example to the total focal length $f'_{ges}=35$ mm for the 35 mm range.

Here, the data refer to the surfaces of the lens elements, numbered in ascending order in the light direction. The first surface 1 describes the air-glass transition at single lens L1 and the last surface 15 the glass-air transition at single lens L8. The aperture stop BL is indicated as a planar surface 8.

The vertex radius r, that is to say the radius on the optical axis, is specified for each surface. The surface type is given in the third column. For example, K01 labels the first surface as an aspherically curved surface and H10 labels the tenth surface as a diffractive surface. dM denotes the center thickness of the respective single lens or the distance to an adjacent surface at the vertex. For the middle group MG, which is designed to be displaceable for focusing purposes, the value dM is given as the distance in the focusing position for infinity, and V01 and V02 label the distances that are variable with the focusing.

ne denotes the refractive index for the Fraunhofer e-line (wavelength 546.0740 nm) and ve the Abbe number for the Fraunhofer e-line.

The assignment of the numbered surfaces to the respective single lenses L1-L8, the subgroups G1-G5, and the groups VG, MG and HG is given in the last three columns:

| Surface | r [mm] | | $d_M$ [mm] | | ne | ve | Lens | Subgroup | Group |
|---|---|---|---|---|---|---|---|---|---|
| 1 | 1.212 | K01 | 0.03 | | 1.489 | 70 | L1 | G1 | VG |
| 2 | 0.523 | | 0.11 | | | | | | |
| 3 | 1.116 | | 0.07 | | 2.060 | 27 | L2 | | |
| 4 | 1.524 | | 0.14 | | | | | | |
| 5 | −0.676 | | 0.03 | | 1.855 | 24 | L3/4 | G2 | |
| 6 | 1.778 | | 0.16 | | 2.009 | 29 | | | |
| 7 | −0.795 | | 0.03 | | | | | | |
| 8 | Planar | Stop | 0.20 | V01 | | | | | |
| 9 | 0.924 | K09 | 0.11 | | 1.489 | 70 | L5 | G3 | MG |
| 10 | Planar | H10 | 0.06 | V02 | | | | | |
| 11 | 1.678 | | 0.16 | | 1.906 | 37 | L6/7 | G4 | HG |
| 12 | −0.716 | | 0.09 | | 1.727 | 29 | | | |
| 13 | 1.287 | | 0.20 | | | | | | |
| 14 | −0.858 | K14 | 0.03 | | 1.605 | 65 | L8 | G5 | |
| 15 | −0.922 | K15 | 0.70 | | | | | | |

The table below shows the conic constant k and the aspherical coefficients a2 to a6 for the aspherical surfaces labeled with K above in relation to the surface type and the phase coefficient C1 for the diffractive surface marked with H, in exponential representation:

| | k | a2 | a3 | a4 |
|---|---|---|---|---|
| K01 | 0.000000E+00 | −4.430040E−01 | −1.130978E+00 | 2.571421E+00 |
| K09 | 0.000000E+00 | 1.543454E−01 | 8.154078E−01 | −1.947892E+00 |
| K14 | 0.000000E+00 | 4.784400E−01 | −9.154765E+00 | −7.196693E+00 |
| K15 | 0.000000E+00 | 1.764385E+00 | −5.506932E+00 | 2.727185E+00 |

| | | a5 | a6 |
|---|---|---|---|
| K01 | | −2.611056E+01 | 5.085493E+01 |
| K09 | | | |
| K14 | | 5.922664E+01 | −8.976027E+02 |
| K15 | | 6.413188E+01 | −2.424672E+02 |

| | C1 |
|---|---|
| H10 | −1.221032E−02 |

Figure 4:
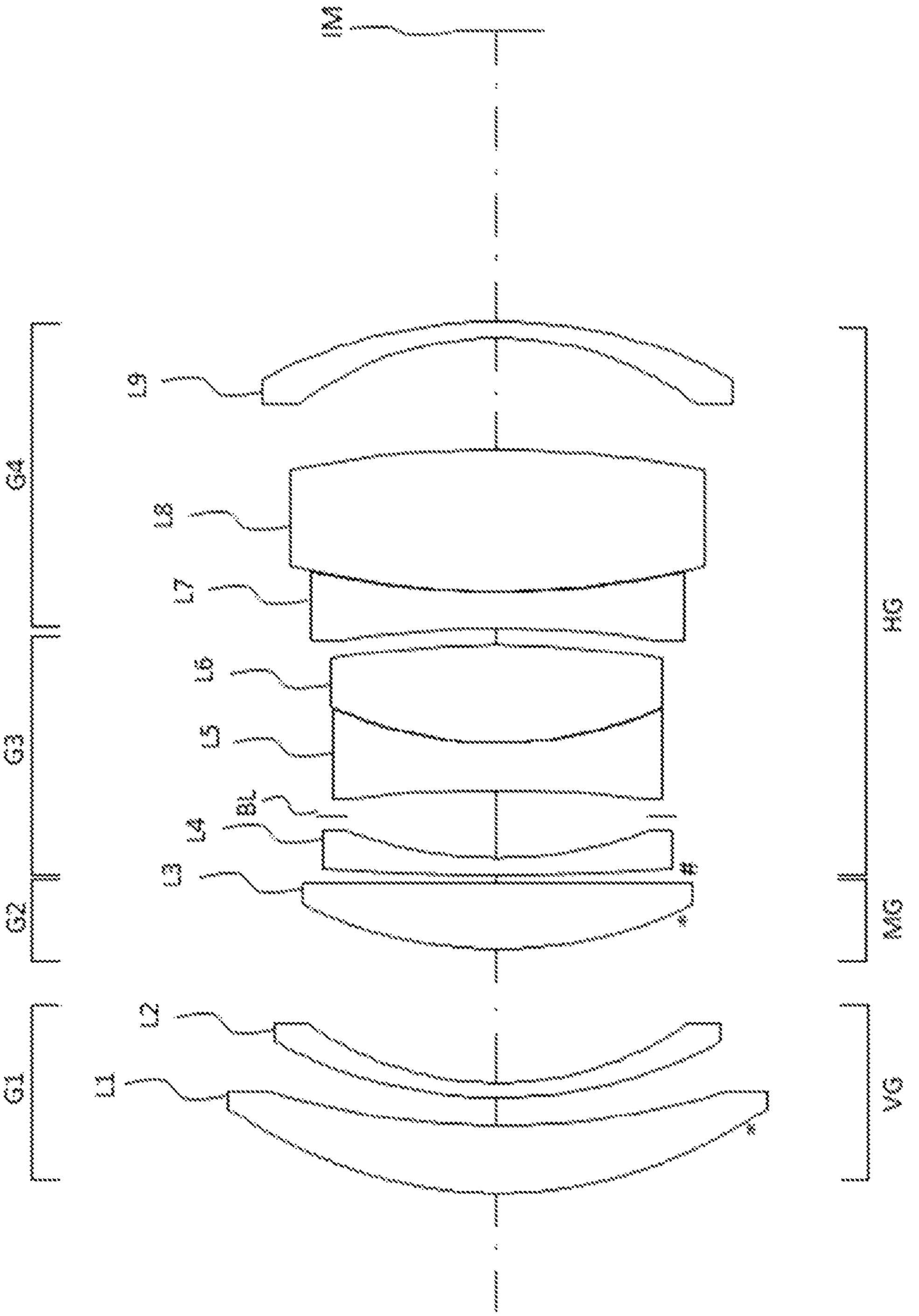
FIG. 4 schematically shows a fourth embodiment of a fixed focal length lens according to the invention.

The exemplary embodiment of a fixed focal length lens shown in FIG. 4 consists of three optical assemblies, a front group VG of positive total optical power, a middle group MG of positive total optical power, and a back group HG of negative or positive total optical power, which are arranged upstream of an image position IM as seen in the light direction.

The lens has a normalized total focal length $f'_{ges}$=1 mm and can be scaled in a known way, for example to the total focal length $f'_{ges}$=50 mm for the 35 mm range.

For a standardized representation, the following numerical values are given by focal length ratios.

The focal length $f'_{VG}$ of the front group VG is defined by the range $$+3.4f'_{VG}/f'_{ges}\leq+4.9,$$

the focal length $f'_{MG}$ of the middle group is in the range $$300.9\leq f'_{MG}/f'_{ges}\leq+1.2,$$

and the focal length $f'_{HG}$ of the back group HG is in the range of $$-0.0949f'_{ges}/f'_{HG}+0.0299.$$

The front group VG consists of one subgroups G1, the middle group MG consists of an optical element G2, and the back group HG has two subgroups G3 and G4. An aperture stop BL with a variable aperture diameter is arranged between a first single lens L4 and a second single lens L5 in the subgroup G3. By definition, the middle group MG is arranged in the vicinity of the stop, that is to say only one further optical element, specifically the single lens L4, is provided between the aperture stop BL and the middle group MG. The middle group MG consists of an optical element G2 and is mounted to be movable, in the direction toward the front group VG, for focusing purposes from the depicted infinity position to a near-focus region counter to the light direction (that is to say in the direction of the arrow shown).

In this lens, the previously described subgroups G1 to G4 consist of single lenses L1 to L9, which, as seen in the light direction, have the optical power sequence +−+−−+−+− The focal length $f'_{VG}$ of the front group VG is particularly advantageously defined by $$f'_{VG}/f'_{ges}=+4.4,$$

the focal length $f'_{MG}$ of the middle group MG is particularly advantageously defined by $$f'_{MG}/f'_{ges}=+1.0,$$

and the focal length $f'_{HG}$ of the back group HG is particularly advantageously defined by $$f'_{ges}/fHG=+0.0271,$$

in each case related to a given total focal length $f'_{ges}$ of the lens.

Advantageously, the optical power $f'_{MG}$ of the middle group MG should, firstly, not be chosen too small because otherwise the focus travel, from focusing at infinity to focusing close-up, will be longer but, secondly, the optical power must not be chosen too large as the volume of the lens will otherwise increase. Both effects have a disadvantageous effect and would result in the lens focusing too slowly and no longer being suitable for autofocus applications.

According to the invention, therefore, the focal length $f'_{MG}$ of the middle group MG should be chosen as $$f'_{MG}/f'_{ges}=+1.0,$$

as already mentioned previously.

The optical element G2 in the middle group MG is designed as a single lens L3 with a surface of diffractive optical power $f'_{DOE}$ within the limits:

$$+25.5\leq f'_{DOE}/f'_{ges}\leq+33.2$$

in order to minimize the chromatic aberration over the entire distance setting range of the lens.

According to the invention, the simple manufacture of the diffractive structure required for the diffractive optical power is made possible on a flat, at least only slightly curved surface. Advantageously, therefore, the vertex radius roof of the diffractive surface of the single lens L3 in the middle group (MG) is planar within the following limits:

$$-0.1020\leq f'_{MG}/r_{DOE}\leq+0.1127.$$

Particularly advantageously, the single lens L3 of the optical element G2 in the middle group MG arranged in the vicinity of the stop BL is in the form of a convex lens with an aspherical first surface and a planar second surface, as seen in the light direction. The planar second surface has a diffractive optical power $f'_{DOE}$ of $$f'_{DOE}/f'_{ges}=+27.4$$

which particularly advantageously brings about the minimization of the chromatic aberration over the entire distance setting range of the lens. The planar second surface is particularly suitable for the simple manufacture of a diffractive structure and the aspherical first surface compensates for the monochromatic aberrations over the distance setting range.

With a distance setting from infinity to the near-focus range, the paraxial imaging scale $\beta'_{MG}$ of the middle group MG is advantageously within the limits:

$$+0.090\leq\beta'_{MG}+0.275.$$

In the range of $$+0.103\leq\beta'_{MG}+0.223,$$

it is possible to obtain a good correction of the aberrations over the entire adjustment range.

The subgroup G1 of the front group VG consists of two members L1 and L2 and has an overall positive optical power. The focal length $f'_{G1}$ of the subgroup G1 is defined by $$f'_{G1}/f'_{ges}=+4.4.$$

The at least one first single lens L1 with positive optical power can be of convex-planar or biconvex form. A preferred embodiment of the single lens L1 is of convex-concave form and arranged with its concave side facing the convex side of the meniscus-shaped convex-concave single lens L2 with negative optical power. The convex surface of the single lens L1 is aspherically curved in the exemplary embodiment. In this way, a correction of the monochromatic aberrations in the image center is advantageously achieved.

The subgroup G3 of the back group HG has three members L4, L5, and L6 with at least one lens with positive optical power and at least one lens with negative optical power and with an overall positive optical power. It advantageously consists of a convex-concave single lens L4 with negative optical power, a biconcave single lens L5 with negative optical power and a biconvex single lens L6 with positive optical power. L4 is arranged with its convex first side facing the middle group MG. In the exemplary embodiment, the members L5 and L6 are designed as individual lens elements and combined as a doublet.

The subgroup G4 of the back group HG has negative total optical power and consists of at least a single lens with positive optical power and a last single lens with negative optical power, the first surface of which is arranged concavely with respect to the subgroup G3. In the exemplary embodiment, G4 consists of a biconcave single lens L7, which is combined with a biconvex single lens L8 to form a doublet. A meniscus-shaped last single lens L9 of negative optical power is arranged with its convex surface facing the image position IM.

The focal length $f'_{G3}$ of the subgroup G3 is advantageously defined by $$f'_{G3}/f'_{ges}=+3.5,$$

while the focal length $f'_{G4}$ of the subgroup G4 is advantageously chosen as $$f'_{G4}/f'_{ges}=-4.1.$$

Advantageously, a compensation for the monochromatic aberrations between the image center and the image field can be achieved using the features of the subgroups G3 and G4.

Advantageously, the refractive index n of at least one of the single lenses of positive optical power in the front group VG has a value greater than or equal to 1.80 ($n \geq 1.80$); the Petzval sum is minimized with n=1.91.

Further advantageously, the refractive index n of at least one of the single lenses of positive optical power in the back group HG is chosen to be greater than or equal to 1.85 ($n \geq 1.85$); the Petzval sum is further minimized with n=1.96.

An advantageously chosen Abbe number v less than or equal to 25 ($v \leq 25$) and in particular equal to 17 ($v \leq 17$) for at least one of the single lenses of negative optical power in the front group VG serves to compensate for chromatic aberrations.

Advantageously, at least one single lens in the front group VG is of aspherical form on one or both sides, the aspherical surface preferably being the surface facing the object side in the case of a single lens of positive optical power and preferably being the surface facing the image side in the case of a single lens of a negative optical power.

In the exemplary embodiment, the first surface of the single lens L1 in the light direction has an aspherically shaped surface. This minimizes monochromatic aberrations in the image center.

A light focusing group MG is advantageous for a high focusing speed. In this case, a ratio of the volume V of the focusing group MG to the image circle diameter Bd in the imaging plane, raised to the third power, of less than 0.1 ($V/Bd^3 \leq 0.1$) was found to be particularly advantageous. In this way, the focusing group is light and allows for quick focusing. At the same time, a lightweight focusing group has the advantage of low power consumption in autofocus applications and enables quiet focusing. The image circle diameter Bd is also known to those skilled in the art as the image diagonal of a digital image recording sensor Bs and is described in more detail with reference to FIG. 10.

Further advantageously, the ratio of the optical overall length SO' of the lens to the image circle diameter Bd in the imaging plane IM is less than or equal to 2.0 ($SO'/Bd \leq 2.0$) for a compact design, with the optical overall length SO' being defined as the distance from the lens vertex of the first lens surface of the single lens L1 on the optical axis in the light direction to the image position in the imaging plane IM.

A lens constructed using the features described above advantageously has a half object angle w in the range between 21° and 26° ($21° \leq w \leq 26°$).

The lens has an aperture ratio F/# of at least 1.7 and at most 2.5 ($1.7 \leq F/\# \leq 2.5$).

The lens shown in FIG. 4 has a particularly compact design by virtue of the ratio of the optical overall length SO' of the lens to the image circle diameter Bd in the imaging the aperture ratio F/# being 2.0 (F/#=2.0).

A ratio of the volume V of the focusing group MG to the image circle diameter Bd in the imaging plane, raised to the third power, of 0.02 ($V/Bd^3=0.02$) was found to be particularly advantageous for high focusing speeds in autofocus applications.

For the exemplary embodiment in FIG. 4, mechanical construction data and optical parameters for the respective lens elements are given in the following tables.

The construction data are normalized to a total focal length $f'_{ges}=1$ mm and can be scaled in a known way, for example to the total focal length $f'_{ges}=50$ mm for the 35 mm range.

Here, the data refer to the surfaces of the lens elements, numbered in ascending order in the light direction. The first surface 1 describes the air-glass transition at single lens L1 and the last surface 17 the glass-air transition at single lens L9. The aperture stop BL is indicated as a planar surface 9.

The vertex radius r, that is to say the radius on the optical axis, is specified for each surface. The surface type is given in the third column. For example, K01 labels the first surface as an aspherically curved surface and H06 labels the sixth surface as a diffractive surface. dM denotes the center thickness of the respective single lens or the distance to an adjacent surface at the vertex. For the middle group MG, which is designed to be displaceable for focusing purposes, the value dM is given as the distance in the focusing position for infinity, and V01 and V02 label the distances that are variable with the focusing.

ne denotes the refractive index for the Fraunhofer e-line (wavelength 546.0740 nm) and ve the Abbe number for the Fraunhofer e-line.

The assignment of the numbered surfaces to the respective single lenses L1-L9, the subgroups G1-G4, and the groups VG, MG and HG is given in the last three columns:

| Surface | r [mm] | | $d_M$ [mm] | | ne | ve | Lens | Subgroup | Group |
|---|---|---|---|---|---|---|---|---|---|
| 1 | 0.532 | K01 | 0.08 | | 1.910 | 31 | L1 | G1 | VG |
| 2 | 0.948 | | 0.04 | | | | | | |
| 3 | 0.560 | | 0.02 | | 1.972 | 17 | L2 | | |
| 4 | 0.396 | | 0.17 | V01 | | | | | |
| 5 | 0.546 | K05 | 0.08 | | 1.518 | 64 | L3 | G2 | MG |
| 6 | Planar | H06 | 0.01 | V02 | | | | | |
| 7 | 3.795 | | 0.02 | | 1.551 | 46 | L4 | G3 | HG |
| 8 | 0.516 | | 0.05 | | | | | | |
| 9 | Planar | Stop | 0.03 | | | | | | |
| 10 | −1.245 | | 0.06 | | 1.597 | 35 | L5/6 | | |
| 11 | 0.478 | | 0.12 | | 1.961 | 32 | | | |
| 12 | −1.285 | | 0.02 | | | | | | |
| 13 | −1.360 | | 0.05 | | 1.652 | 34 | L7/8 | G4 | |
| 14 | 0.997 | | 0.18 | | 1.888 | 41 | | | |

-continued

| Surface | r [mm] | $d_M$ [mm] | ne | ve | Lens | Subgroup | Group |
|---|---|---|---|---|---|---|---|
| 15 | −1.269 | 0.14 | | | | | |
| 16 | −0.400 | 0.02 | 1.933 | 21 | L9 | | |
| 17 | −0.605 | 0.37 | | | | | |

The table below shows the conic constant k and the aspherical coefficients a2 to a6 for the aspherical surfaces labeled with K above in relation to the surface type and the phase coefficient C1 for the diffractive surface marked with H06, in exponential representation:

| | k | a2 | a3 | a4 |
|---|---|---|---|---|
| K01 | 0.000000E+00 | −3.015862E−01 | −9.283949E−01 | −1.282139E+01 |
| K05 | 0.000000E+00 | 1.963632E−01 | 2.444841E+00 | 3.582799E+01 |

| | | a5 | a6 | |
|---|---|---|---|---|
| K01 | | 6.111922E+01 | −3.499943E+02 | |
| K05 | | | | |

| | C1 | C2 | C3 | C4 |
|---|---|---|---|---|
| H06 | −1.826613E−02 | | | |

Figure 5:
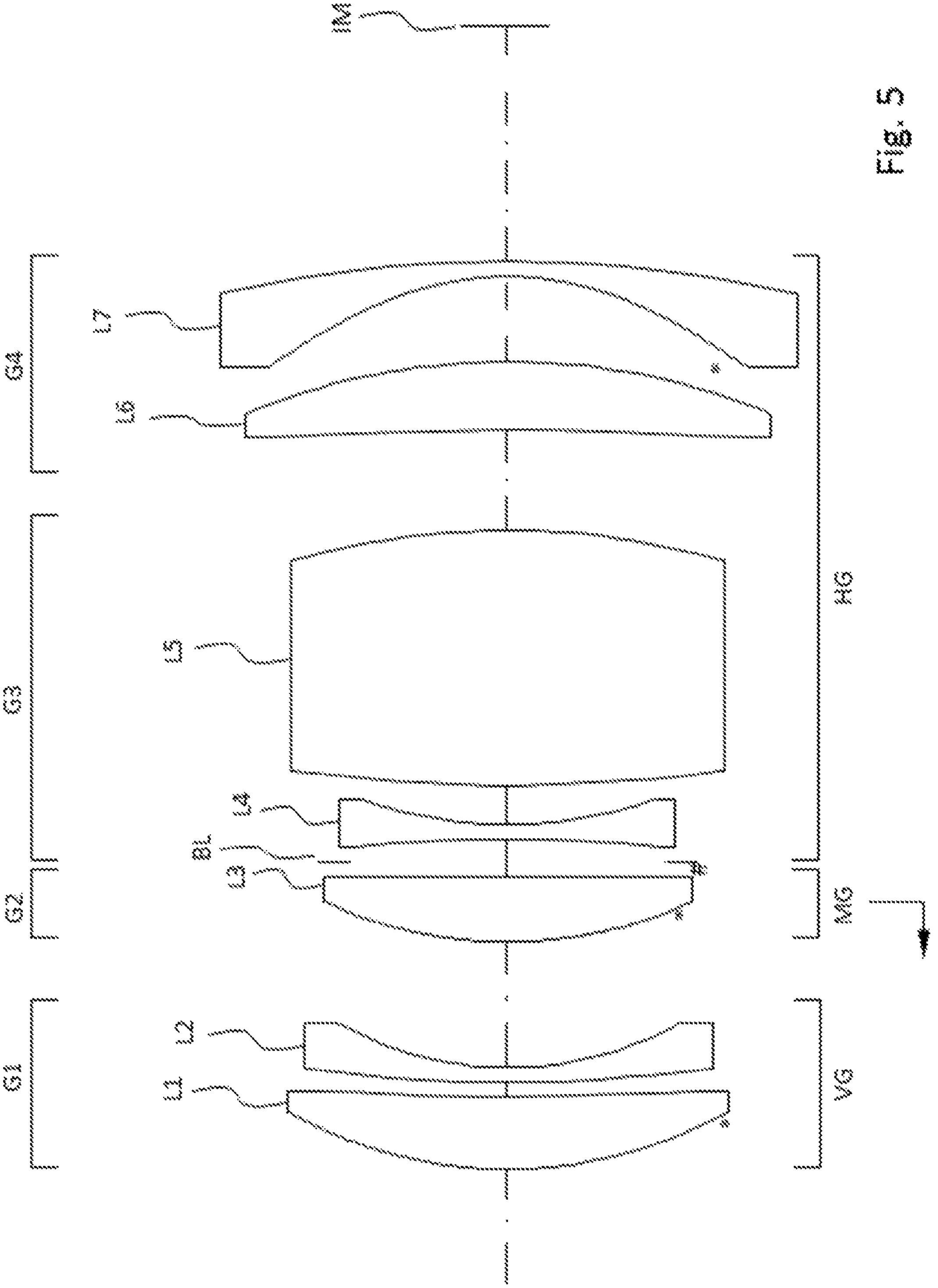
FIG. 5 schematically shows a fifth embodiment of a fixed focal length lens according to the invention.

An exemplary embodiment of a fixed focal length lens shown in FIG. 5 consists of three optical assemblies, a front group VG of positive total optical power, a middle group MG of positive total optical power, and a back group HG of negative or positive total optical power, which are arranged upstream of an image position IM as seen in the light direction.

The lens has a normalized total focal length $f'_{ges}$=1 mm and can be scaled in a known way, for example to the total focal length $f_{ges}$=50 mm for the 35 mm range.

For a standardized representation, the following numerical values are given by focal length ratios.

The focal length $f'_{VG}$ of the front group VG is defined by the range $$+3.4f'_{VG}/f'_{ges} \leq +4.9,$$

the focal length $f'_{MG}$ of the middle group is in the range $$+0.9 \leq f'_{MG}/f'_{ges} \leq +1.2,$$

and the focal length $f'_{HG}$ of the back group HG is in the range of $$-0.0949f'_{ges}/f'_{HG} \leq +0.0299.$$

The front group VG consists of one subgroup G1, the middle group MG consists of an optical element G2, and the back group HG has two subgroups G3 and G4. An aperture stop BL with a variable aperture diameter is arranged upstream of a first single lens L4 in the subgroup G3. By definition, the middle group MG is provided upstream of the aperture stop BL in the vicinity of the said stop, as seen in in the light direction. The middle group MG consists of an optical element G2 and is mounted to be movable, in the direction toward the front group VG, for focusing purposes from the depicted infinity position to a near-focus region counter to the light direction (that is to say in the direction of the arrow shown).

In this lens, the previously described subgroups G1 to G4 consist of single lenses L1 to L7, which, as seen in the light direction, have the optical power sequence +−+−++−. The focal length $f'_{VG}$ of the front group VG is particularly advantageously defined by $$f'_{VG}/f'_{ges} = +3.8,$$

the focal length $f'_{MG}$ of the middle group MG is particularly advantageously defined by $$f'_{MG}/f'_{ges} = +1.1,$$

and the focal length $f'_{HG}$ of the back group HG is particularly advantageously defined by $$f'_{ges}/f'_{HG} = -0.0858,$$

in each case related to a given total focal length $f'_{ges}$ of the lens.

Advantageously, the optical power $f'_{MG}$ of the middle group MG should, firstly, not be chosen too small because otherwise the focus travel, from focusing at infinity to focusing close-up, will be longer but, secondly, the optical power must not be chosen too large as the volume of the lens will otherwise increase. Both effects have a disadvantageous effect and would result in the lens focusing too slowly and no longer being suitable for autofocus applications.

According to the invention, therefore, the focal length $f'_{MG}$ of the middle group MG, as already mentioned, should be chosen as $$f'_{MG}/f'_{ges} = +1.1.$$

The optical element G2 in the middle group MG is designed as a single lens L3 with a surface of diffractive optical power $f'_{DOE}$ within the limits:

$$+25.5 \leq f'_{DOE}/f'_{ges} \leq +33.2$$

in order to minimize the chromatic aberration over the entire distance setting range of the lens.

According to the invention, the simple manufacture of the diffractive structure required for the diffractive optical power is made possible on a flat, at least only slightly curved surface. Advantageously, therefore, the vertex radius roof of the diffractive surface of the single lens L3 in the middle group (MG) is planar within the following limits:

$$-0.1020 \leq f'_{MG}/r_{DOE} \leq +0.1127.$$

Particularly advantageously, the single lens L3 of the optical element G2 in the middle group MG arranged in the vicinity of the stop BL is in the form of a convex lens with an aspherical first surface and a planar second surface, as seen in the light direction. The planar second surface has a diffractive optical power $f'_{DOE}$ of $$f'_{DOE}/f'_{ges} = +29.2$$

which particularly advantageously brings about the minimization of the chromatic aberration over the entire distance setting range of the lens. The planar second surface is particularly suitable for the simple manufacture of a diffractive structure and the aspherical first surface compensates for the monochromatic aberrations over the distance setting range.

With a distance setting from infinity to the near-focus range, the paraxial imaging scale $\beta'_{MG}$ of the middle group MG is advantageously within the limits:

$$+0.090 \leq \beta'_{MG} +0.275.$$

In the range of $$+0.139 \leq \beta'_{MG} +0.254,$$

it is possible to obtain a good correction of the aberrations over the entire adjustment range.

The subgroup G1 of the front group VG consists of two members L1 and L2 and has an overall positive optical power. The focal length $f'_{G1}$ of the subgroup G1 is defined by $$f'_{G1}/f'_{ges}=3.8.$$

The at least one first single lens L1 with positive optical power can be of convex-planar or biconvex form. A preferred embodiment of the single lens L1 is of convex-concave form and arranged with its concave side facing the convex side of the meniscus-shaped convex-concave single lens L2 with negative optical power. The convex surface of the single lens L1 is aspherically curved in the exemplary embodiment. In this way, a correction of the monochromatic aberrations in the image center is advantageously achieved.

The subgroup G3 of the back group HG has two members L4 and L5 with at least one lens with positive optical power and at least one lens with negative optical power and with an overall positive optical power. It advantageously consists of a biconcave single lens L4 with negative optical power and a biconvex single lens L5 with positive optical power. In the exemplary embodiment, the members L4 and L5 are designed as individual lens elements.

The subgroup G4 of the back group HG has negative total optical power and consists of at least a single lens with positive optical power and a last single lens with negative optical power, the first surface of which is arranged concavely with respect to the subgroup G3. In the exemplary embodiment, G4 consists of a concave-convex single lens L6 and a meniscus-shaped last single lens L7 of negative optical power, which is arranged with its convex surface facing image position IM.

The focal length $f'_{G3}$ of the subgroup G3 is advantageously defined by $$f'_{G3}/f'_{ges}=+4.1,$$

while the focal length $f'_{G4}$ of the subgroup G4 is advantageously chosen as $$f'_{G4}/f'_{ges}=-3.21.$$

Advantageously, a compensation for the monochromatic aberrations between the image center and the image field can be achieved using the features of the subgroups G3 and G4.

Advantageously, the refractive index n of at least one of the single lenses of positive optical power in the front group VG has a value greater than or equal to 1.80 ($n \geq 1.80$); the Petzval sum is minimized with $n=1.96$.

Further advantageously, the refractive index n of at least one of the single lenses of positive optical power in the back group HG is chosen to be greater than or equal to 1.85 ($n \geq 1.85$); the Petzval sum is further minimized with $n=1.89$.

An advantageously chosen Abbe number v less than or equal to 25 ($v \leq 25$) and in particular equal to 23 ($v \leq 23$) for at least one of the single lenses of negative optical power in the front group VG serves to compensate for chromatic aberrations.

Advantageously, at least one single lens in the front group VG is of aspherical form on one or both sides, the aspherical surface preferably being the surface facing the object side in the case of a single lens of positive optical power and preferably being the surface facing the image side in the case of a single lens of negative optical power.

In the exemplary embodiment, the first surface of the single lens L1 in the light direction has an aspherically shaped surface. This minimizes monochromatic aberrations in the image center.

To compensate for the monochromatic aberrations in the image field, the last single lens in the back group HG is advantageously formed with an aspherical surface on one or both sides.

In the exemplary embodiment, the first, concavely shaped lens surface of the single lens L7 in the light direction has an aspherical shape.

A light focusing group MG is advantageous for a high focusing speed. In this case, a ratio of the volume V of the focusing group MG to the image circle diameter Bd in the imaging plane, raised to the third power, of less than 0.1 ($V/Bd^3 \leq 0.1$) was found to be particularly advantageous. In this way, the focusing group is light and allows for quick focusing. At the same time, a lightweight focusing group has the advantage of low power consumption in autofocus applications and enables quiet focusing. The image circle diameter Bd is also known to those skilled in the art as the image diagonal of a digital image recording sensor Bs and is described in more detail below with reference to FIG. 10.

Further advantageously, the ratio of the optical overall length SO' of the lens to the image circle diameter Bd in the imaging plane IM is less than or equal to 2.0 ($SO'/Bd \leq 2.0$) for a compact design, with the optical overall length SO' being defined as the distance from the lens vertex of the first lens surface of the single lens L1 on the optical axis in the light direction to the image position IM.

A lens constructed using the features described above advantageously has a half object angle w in the range between 21° and 26° ($21° \leq w \leq 26°$).

The lens has an aperture ratio F/# of at least 1.7 and at most 2.5 ($1.7 \leq F/\# \leq 2.5$).

The lens shown in FIG. 5 has a particularly compact design by virtue of the ratio of the optical overall length SO' of the lens to the image circle diameter Bd in the imaging the aperture ratio F/# being 2.0 ($F/\#=2.0$).

A ratio of the volume V of the focusing group MG to the image circle diameter Bd in the imaging plane, raised to the third power, of 0.01 ($V/Bd^3=0.01$) was found to be particularly advantageous for high focusing speeds in autofocus applications.

For the exemplary embodiment in FIG. 5, mechanical construction data and optical parameters for the respective lens elements are given in the following tables.

The construction data are normalized to a total focal length $f'_{ges}=1$ mm and can be scaled in a known way, for example to the total focal length $f'_{ges}=50$ mm for the 35 mm range.

Here, the data refer to the surfaces of the lens elements, numbered in ascending order in the light direction. The first surface 1 describes the air-glass transition at single lens L1 and the last surface 15 the glass-air transition at single lens L7. The aperture stop BL is indicated as a planar surface 7.

The vertex radius r, that is to say the radius on the optical axis, is specified for each surface. The surface type is given in the third column. For example, K01 labels the first surface as an aspherically curved surface and H06 labels the sixth surface as a diffractive surface. dM denotes the center thickness of the respective single lens or the distance to an adjacent surface at the vertex. For the middle group MG, which is designed to be displaceable for focusing purposes, the value dM is given as the distance in the focusing position for infinity, and V01 and V02 label the distances that are variable with the focusing.

ne denotes the refractive index for the Fraunhofer e-line (wavelength 546.0740 nm) and ve the Abbe number for the Fraunhofer e-line.

The assignment of the numbered surfaces to the respective single lenses L1-L9, the subgroups G1-G4, and the groups VG, MG and HG is given in the last three columns:

| Surface | r [mm] | | $d_M$ [mm] | | ne | ve | Lens | Subgroup | Group |
|---|---|---|---|---|---|---|---|---|---|
| 1 | 0.520 | K1 | 0.09 | | 1.959 | 30 | L1 | G1 | VG |
| 2 | 2.797 | | 0.02 | | | | | | |
| 3 | 1.594 | | 0.02 | | 1.816 | 23 | L2 | | |
| 4 | 0.413 | | 0.15 | V01 | | | | | |
| 5 | 0.538 | K05 | 0.08 | | 1.498 | 81 | L3 | G2 | MG |
| 6 | Planar | H06 | 0.02 | V02 | | | | | |
| 7 | Planar | Stop | 0.03 | | | | | G3 | HG |
| 8 | −2.083 | | 0.02 | | 1.520 | 52 | L4 | | |
| 9 | 0.532 | | 0.05 | | | | | | |
| 10 | 1.790 | | 0.31 | | 1.758 | 52 | L5 | | |
| 11 | −0.885 | | 0.12 | | | | | | |
| 12 | −4.476 | | 0.08 | | 1.888 | 41 | L6 | G4 | |
| 13 | −0.793 | | 0.10 | | | | | | |
| 14 | −0.352 | K14 | 0.02 | | 1.624 | 36 | L7 | | |
| 15 | −1.558 | | 0.29 | | | | | | |

The table below shows the conic constant k and the aspherical coefficients a2 to a7 for the aspherical surfaces labeled with K above in relation to the surface type and the phase coefficient C1 for the diffractive surface marked with H06, in exponential representation:

| | k | a2 | a3 | a4 |
|---|---|---|---|---|
| K01 | 0.000000E+00 | −4.225511E−01 | −1.580440E+00 | −1.592637E+01 |
| K05 | 0.000000E+00 | 1.525217E−01 | 5.243852E+00 | 1.002054E+01 |
| K14 | 0.000000E+00 | 3.648403E+00 | 1.892784E+01 | −9.952660E+01 |

| | | a5 | a6 | a7 |
|---|---|---|---|---|
| K01 | | 1.155127E+02 | −6.377694E+02 | |
| K05 | | | | |
| K14 | | 2.754833E+03 | −2.466843E+04 | 1.643722E+05 |

| | C1 | C2 | C3 | C4 |
|---|---|---|---|---|
| H06 | −1.712233E−02 | | | |

Figure 6:
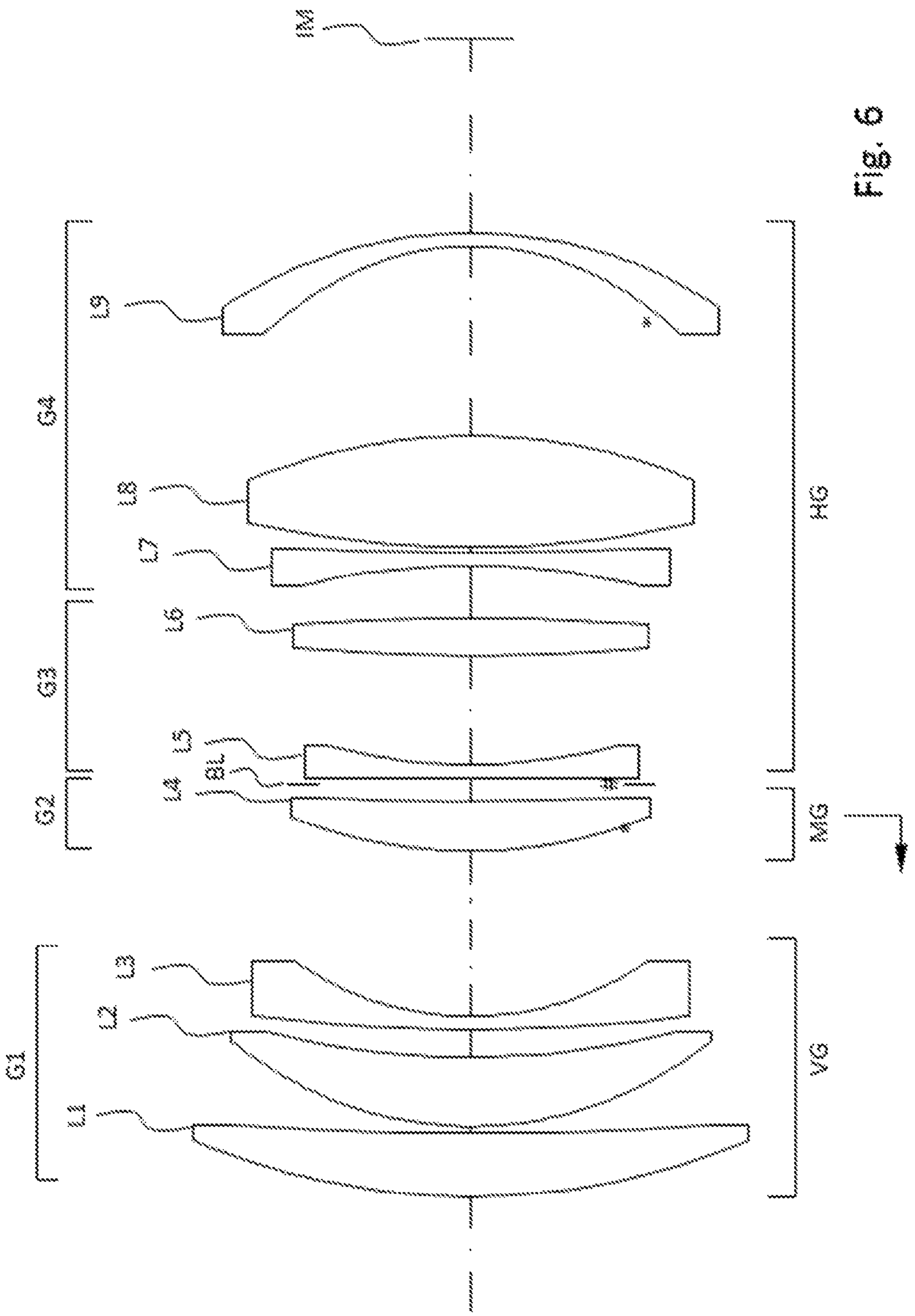
FIG. 6 schematically shows a sixth embodiment of a fixed focal length lens according to the invention.

The exemplary embodiment of a fixed focal length lens shown in FIG. 6 consists of three optical assemblies, a front group VG of positive total optical power, a middle group MG of positive total optical power, and a back group HG of positive total optical power, which are arranged upstream of an image position IM as seen in the light direction.

The lens has a normalized total focal length $f'_{ges}$=1 mm and can be scaled in a known way, for example to the total focal length $f'_{ges}$=75 mm for the 35 mm range.

For a standardized representation, the following numerical values are given by focal length ratios.

The focal length $f'_{VG}$ of the front group VG is defined by the range $$+1.4 \le f'_{VG}/f'_{ges} \le +2.2,$$

the focal length $f'_{MG}$ of the middle group is in the range $$+0.5 \le f'_{MG}/f'_{ges} \le +1.0,$$

and the positive or negative focal length $f'_{HG}$ of the back group HG is in the absolute value range of $$2.3 \le |f'_{HG}/f'_{ges}| \le +3.8.$$

The front group VG consists of three lens elements L1, L2 and L3, the middle group MG consists of an optical element L4, and the back group HG has two subgroups G3 and G4. An aperture stop BL with a changeable aperture diameter is arranged between the middle group MG and the back group HG. By definition, the middle group MG is arranged in the vicinity of the stop, that is to say at most one further optical element, no further optical element in this exemplary embodiment, is arranged between the aperture stop BL and the middle group MG. The middle group MG is mounted to be movable, in the direction toward the front group VG, for focusing purposes from the depicted infinity position to a near-focus region counter to the light direction (that is to say in the direction of the arrow shown).

In this lens, the previously described groups VG, MG, and HG consist of single lenses L1 to L9, which, as seen in the light direction, have the optical power sequence ++−+−+−+−.

The focal length $f'_{VG}$ of the front group VG is particularly advantageously defined by $$f'_{VG}/f'_{ges}=+2.0,$$

the focal length $f'_{MG}$ of the middle group MG is particularly advantageously defined by $$f'_{MG}/f'_{ges}=+0.9,$$

and the positive or negative focal length $f'_{HG}$ of the back group HG is particularly advantageously defined by $$|f'_{HG}/f'_{ges}|=3.4,$$

in each case related to a given total focal length $f'_{ges}$ of the lens.

Advantageously, the optical power $f'_{MG}$ of the middle group MG should, firstly, not be chosen too small because otherwise the focus travel, from focusing at infinity to focusing close-up, will be longer but, secondly, the optical power must not be chosen too large as the volume of the lens will otherwise increase. Both effects have a disadvantageous effect and would result in the lens focusing too slowly and no longer being suitable for autofocus applications.

According to the invention, therefore, the focal length $f'_{MG}$ of the middle group MG, as already mentioned, should be chosen as $$f'_{MG}/f'_{ges}=+0.9.$$

The optical element in the middle group MG is designed as a single lens L4 with a surface of diffractive optical power $f'_{DOE}$ within the limits:

$$+14.9 \leq f'_{DOE}/f'_{ges} \leq +24.9$$

in order to minimize the chromatic aberration over the entire distance setting range of the lens.

According to the invention, the simple manufacture of the diffractive structure required for the diffractive optical power is made possible on a flat, at least only slightly curved surface. Advantageously, therefore, the vertex radius $r_{DOE}$ of the diffractive surface of the single lens L4 in the middle group MG with focal length $f'_{MG}$ is defined as virtually planar for the purposes of the invention in this exemplary embodiment with, $$f'_{MG}/r_{DOE} = 0.2849$$

or $$r_{DOE} \geq 3.159 \text{ mm}.$$

Particularly advantageously, the single lens L4 in the middle group MG arranged in the vicinity of the stop BL is in the form of a convex lens with positive optical power and with an aspherical first surface and a virtually planar second surface, as seen in the light direction. The virtually planar second surface has a diffractive optical power $f'_{DOE}$ of $$f'_{DOE}/f'_{ges} = +22.5$$

which particularly advantageously brings about the minimization of the chromatic aberration over the entire distance setting range of the lens. The virtually planar second surface is particularly suitable for the simple manufacture of a diffractive structure and the aspherical first surface compensates for the monochromatic aberrations over the distance setting range.

With a distance setting from infinity to the near-focus range, the paraxial imaging scale $\beta'_{MG}$ of the middle group MG is advantageously within the limits:

$$+0.254 \leq \beta'_{MG} + 0.415.$$

In the range of $$+0.266 \leq \beta'_{MG} + 0.396,$$

it is possible to obtain a good correction of the aberrations over the entire adjustment range.

The front group VG consists of at least a first single lens L1 with positive optical power and a last lens of negative optical power with a first concave side in the light direction.

In the exemplary embodiment, the front group VG is formed from three single lenses L1, L2 and L3 and has a positive optical power overall. The single lenses L1 and L2 are designed as convex-concave or convex-plane single lenses, each with a positive optical power, and the single lens L3 is designed as a meniscus-shaped convex-concave lens of negative optical power. In this way, a correction of the monochromatic aberrations in the image center is advantageously achieved.

The subgroup G3 in the back group HG has a negative optical power and consists of at least a first single lens of negative optical power and a last single lens of positive optical power. In the exemplary embodiment, it consists of the lens members L5 and L6. The single lens L5 is advantageously formed as a plano-concave single lens of negative optical power with a plane surface arranged facing the aperture stop BL, or the middle group MG, and the single lens L6 is embodied as a biconvex single lens of positive optical power.

The subgroup G4 of the back group HG has positive total optical power and consists of at least a last-but-one single lens with positive optical power and a last single lens with negative optical power, the first surface of which is arranged concavely with respect to the subgroup G3. In the exemplary embodiment, the subgroup G4 consists of a biconcave single lens L7 of negative optical power, a biconvex single lens L8 of positive optical power, and a meniscus-shaped last single lens L9 of negative optical power, which is arranged with its convex surface facing image position IM.

The focal length $f'_{G3}$ of the subgroup G3 is advantageously defined by $$f'_{G3}/f'_{ges} = -2.8,$$

while the focal length $f'_{G4}$ of the subgroup G4 is advantageously chosen as $$f'_{G4}/f'_{ges} = +9.7.$$

Advantageously, a compensation for the monochromatic aberrations between the image center and the image field can be achieved using the features of the subgroups G3 and G4.

Advantageously, the refractive index n of at least one of the single lenses of positive optical power in the front group VG has a value greater than or equal to 1.85 ($n \geq 1.85$); the Petzval sum is minimized with $n = 1.92$.

An advantageously chosen Abbe number v greater than or equal to 60 ($v \geq 60$) and in particular equal to 71 ($v = 71$) for at least one of the single lenses of positive optical power in the front group VG serves to compensate for, or minimize, chromatic aberrations.

Further advantageously, the refractive index n of at least one of the single lenses of negative optical power in the front group VG is chosen to be less than or equal to 1.75 ($n \leq 1.75$); the Petzval sum is minimized with $n = 1.70$.

Advantageously, the last single lens in the back group HG is of aspherical form on one or both sides. In the exemplary embodiment, the last single lens L9 has an aspherical embodiment on one side, with the first, concave surface of the single lens L9 in the light direction having an aspherically shaped surface. This minimizes monochromatic aberrations in the image field.

A light focusing group MG is advantageous for a high focusing speed. In this case, a ratio of the volume V of the focusing group MG to the image circle diameter Bd in the imaging plane, raised to the third power, of less than 0.1 ($V/Bd^3 < 0.1$) was found to be particularly advantageous. In this way, the focusing group is light and allows for quick focusing. At the same time, a lightweight focusing group has the advantage of low power consumption in autofocus applications and enables quiet focusing. The image circle diameter Bd is also known to those skilled in the art as the image diagonal of a digital image recording sensor Bs and is described in more detail below with reference to FIG. 10.

Further advantageously, the ratio of the optical overall length SO' of the lens to the image circle diameter Bd in the imaging plane IM is less than or equal to 3.0 ($SO'/Bd \leq 3.0$) for a compact design, with the optical overall length SO' being defined as the distance from the lens vertex of the first lens surface of the single lens L1 on the optical axis in the light direction to the image position IM in the imaging plane.

A lens constructed using the features described above advantageously has a half object angle w in the range between 10° and 18° ($10° \leq w \leq 18°$).

The lens has an aperture ratio F/# of at least 1.7 and at most 2.5 ($1.7 \leq F/\# \leq 2.5°$).

The lens shown in FIG. 6 has a particularly compact design by virtue of the ratio of the optical overall length SO' of the lens to the image circle diameter Bd in the imaging plane IM being 2.08 (SO'/Bd=2.08), the half object angle w equaling 16° (w=16°), and the aperture ratio F/# being 2.0 (F/#=2.0).

A ratio of the volume V of the focusing group MG to the image circle diameter Bd in the imaging plane, raised to the third power, of 0.02 ($V/Bd^3=0.02$) was found to be particularly advantageous for high focusing speeds in autofocus applications.

For the exemplary embodiment in FIG. 6, mechanical construction data and optical parameters for the respective lens elements are given in the following tables.

The construction data are normalized to a total focal length $f'_{ges}=1$ mm and can be scaled in a known way, for example to the total focal length $f'_{ges}=75$ mm for the 35 mm range.

Here, the data refer to the surfaces of the lens elements, numbered in ascending order in the light direction. The first surface 1 describes the air-glass transition at single lens L1 and the last surface 19 the glass-air transition at single lens L9. The aperture stop BL is indicated as a planar surface 9.

The vertex radius r, that is to say the radius on the optical axis, is specified for each surface. The surface type is given in the third column. For example, K07 labels the seventh surface as an aspherically curved surface and H08 labels the eighth surface as a diffractive surface. dM denotes the center thickness of the respective single lens or the distance to an adjacent surface at the vertex. For the middle group MG, which is designed to be displaceable for focusing purposes, the value dM is given as the distance in the focusing position for infinity, and V01 and V02 label the distances that are variable with the focusing.

ne denotes the refractive index for the Fraunhofer e-line (wavelength 546.0740 nm) and ve the Abbe number for the Fraunhofer e-line.

The assignment of the numbered surfaces to the respective single lenses L1-L9, the subgroups G1-G4, and the groups VG, MG and HG is given in the last three columns:

| Surface | r [mm] | | $d_M$ [mm] | | ne | ve | Lens | Subgroup | Group |
|---|---|---|---|---|---|---|---|---|---|
| 1 | 0.708 | | 0.07 | | 1.923 | 32 | L1 | G1 | VG |
| 2 | 3.729 | | 0.01 | | | | | | |
| 3 | 0.370 | | 0.07 | | 1.571 | 71 | L2 | | |
| 4 | 0.863 | | 0.03 | | | | | | |
| 5 | 1.790 | | 0.01 | | 1.704 | 30 | L3 | | |
| 6 | 0.299 | | 0.17 | V01 | | | | | |
| 7 | 0.478 | K07 | 0.05 | | 1.519 | 64 | L4 | G2 | MG |
| 8 | 3.159 | H08 | 0.02 | V02 | | | | | |
| 9 | Planar | Stop | 0.01 | | | | | | |
| 10 | 63.491 | | 0.01 | | 1.816 | 23 | L5 | G3 | HG |
| 11 | 0.560 | | 0.11 | | | | | G4 | |
| 12 | 1.818 | | 0.04 | | 1.910 | 31 | L6 | | |
| 13 | −2.123 | | 0.05 | | | | | | |
| 14 | −0.705 | | 0.01 | | 1.498 | 81 | L7 | | |
| 15 | 3.266 | | 0.01 | | | | | | |
| 16 | 1.021 | | 0.12 | | 1.658 | 39 | L8 | | |
| 17 | −0.543 | | 0.20 | | | | | | |
| 18 | −0.255 | K18 | 0.01 | | 1.697 | 53 | L9 | | |
| 19 | −0.442 | | 0.20 | | | | | | |

The table below shows the conic constant k and the aspherical coefficients a2 to a6 for the aspherical surfaces labeled with K above in relation to the surface type and the phase coefficient C1 for the diffractive surface marked with H08, in exponential representation:

| | k | a2 | a3 | a4 |
|---|---|---|---|---|
| K07 | 0.000000E+00 | 4.994023E−01 | 3.453017E+00 | 5.331842E+01 |
| K18 | 0.000000E+00 | 4.922770E+00 | 3.920850E+01 | 1.683780E+03 |

| | | a5 | a6 | |
|---|---|---|---|---|
| K07 | | −3.900157E+04 | 6.874722E+05 | |
| K18 | | | | |

| | C1 | C2 | C3 | C4 |
|---|---|---|---|---|
| H08 | −2.219642E−02 | | | |

Figure 7:
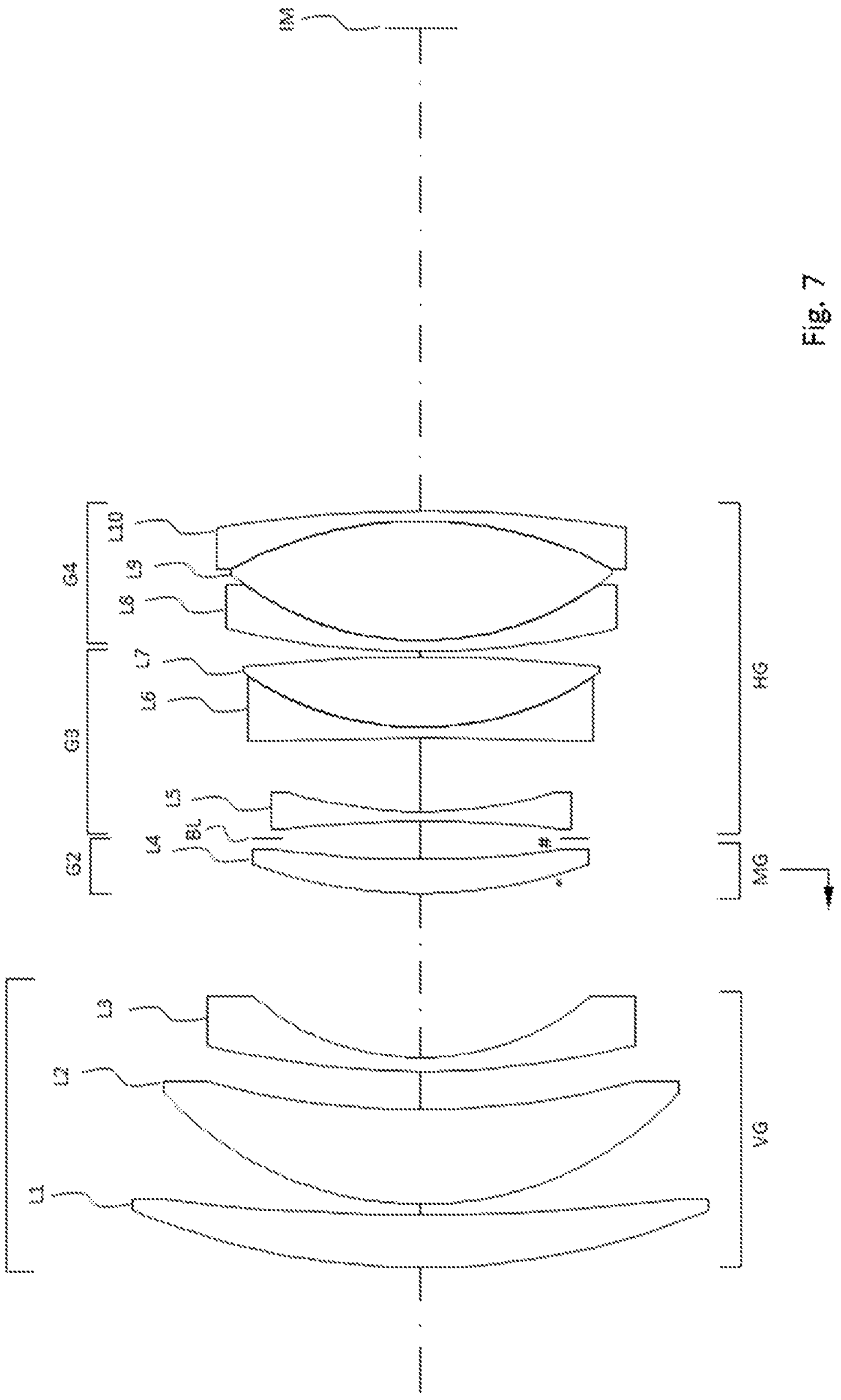
FIG. 7 schematically shows a seventh embodiment of a fixed focal length lens according to the invention.

The exemplary embodiment of a fixed focal length lens shown in FIG. 7 consists of three optical assemblies, a front group VG of positive total optical power, a middle group MG of positive total optical power, and a back group HG of positive total optical power, which are arranged upstream of an image position IM as seen in the light direction.

The lens has a normalized total focal length $f'_{ges}=1$ mm and can be scaled in a known way, for example to the total focal length $f'_{ges}=100$ mm for the 35 mm range.

For a standardized representation, the following numerical values are given by focal length ratios.

The focal length $f'_{VG}$ of the front group VG is defined by the range $$+1.4 \le f'_{VG}/f'_{ges} \le +2.2,$$

the focal length $f'_{MG}$ of the middle group is in the range $$+0.5 \le f'_{MG}/f'_{ges} \le +1.0,$$

and the positive or negative focal length $f'_{HG}$ of the back group HG is in the absolute value range of $$+2.3 \le |f'_{HG}/f'_{ges}| \le 303.8.$$

The front group VG consists of three lens elements L1, L2 and L3, the middle group MG consists of an optical element L4, and the back group HG has two subgroups G3 and G4. An aperture stop BL with a changeable aperture diameter is arranged between the middle group MG and the back group HG. By definition, the middle group MG is arranged in the vicinity of the stop, that is to say at most one further optical element, no further optical element in this exemplary embodiment, is arranged between the aperture stop BL and the middle group MG. The middle group MG is mounted to be movable, in the direction toward the front group VG, for focusing purposes from the depicted infinity position to a near-focus region counter to the light direction (that is to say in the direction of the arrow shown).

In this lens, the previously described groups VG, MG, and HG consist of single lenses L1 to L10, which, as seen in the light direction, have the optical power sequence ++−+−−+−+−.

The focal length $f'_{VG}$ of the front group VG is particularly advantageously defined by $$f'_{VG}/f'_{ges}=+1.5,$$

the focal length $f'_{MG}$ of the middle group MG is particularly advantageously defined by $$f'_{MG}/f'_{ges}=+0.6,$$

and the positive or negative focal length $f'_{HG}$ of the back group HG is particularly advantageously defined by $$|f'_{NG}/f'_{ges}|=+2.5,$$

in each case related to a given total focal length $f'_{ges}$ of the lens.

Advantageously, the optical power $f'_{MG}$ of the middle group MG should, firstly, not be chosen too small because otherwise the focus travel, from focusing at infinity to focusing close-up, will be longer but, secondly, the optical power must not be chosen too large as the volume of the lens will otherwise increase. Both effects have a disadvantageous effect and would result in the lens focusing too slowly and no longer being suitable for autofocus applications.

According to the invention, therefore, the focal length $f'_{MG}$ of the middle group MG should, as already mentioned, be chosen as $$f'_{MG}/f'_{ges}=+0.6.$$

The optical element in the middle group MG is designed as a single lens L4 with a surface of diffractive optical power $f'_{DOE}$ within the limits:

$$+14.9\le f'_{DOE}/f'_{ges}\le+24.9$$

in order to minimize the chromatic aberration over the entire distance setting range of the lens.

According to the invention, a simple manufacture of the diffractive structure required for the diffractive optical power is made possible on a flat, but at least only slightly curved surface. Advantageously, therefore in the exemplary embodiment, a vertex radius roof of the diffractive surface of the single lens L4 in the middle group (MG) with focal length $f'_{MG}$ in this exemplary embodiment is defined as virtually planar for the purposes of the invention, with $$f'_{MG}/r_{DOE}=0.5923$$

or $$r_{DOE}\ge+1.013 \text{ mm}.$$

Particularly advantageously, the single lens L4 in the middle group MG arranged in the vicinity of the stop BL is in the form of a convex lens with positive optical power and with an aspherical first surface and a virtually planar second surface, as seen in the light direction. The second surface, which is virtually planar per definition, has a diffractive optical power $f'_{DOE}$ of $$f'_{DOE}/f'_{ges}=+16.7$$

which particularly advantageously brings about the minimization of the chromatic aberration over the entire distance setting range of the lens. The virtually planar second surface is particularly suitable for the simple manufacture of a diffractive structure and the aspherical first surface compensates for the monochromatic aberrations over the distance setting range.

With a distance setting from infinity to the near-focus range, the paraxial imaging scale $\beta'_{MG}$ of the middle group MG is advantageously within the limits:

$$+0.254\le\beta'_{MG}+0.415.$$

In the range of $$+0.281\le\beta'_{MG}+0.395,$$

it is possible to obtain a good correction of the aberrations over the entire adjustment range.

The front group VG consists of at least a first single lens L1 with positive optical power and a last lens of negative optical power with a first concave side in the light direction.

In the exemplary embodiment, the front group VG is formed from three single lenses L1, L2 and L3 and has a positive optical power overall. In this case, the single lenses L1 and L2 can be embodied to be convex-planar or biconvex and are designed in the exemplary embodiment as convex-concave single lenses, each with positive optical power, and the single lens L3 is in the form of a meniscus-shaped convex-concave lens with negative optical power. In this way, a correction of the monochromatic aberrations in the image center is advantageously achieved.

The subgroup G3 in the back group HG has a negative total optical power and consists of at least a first single lens of negative optical power and a last single lens of positive or negative optical power. In the exemplary embodiment, it consists of the lens members L5, L6 and L7. The single lens L5 is advantageously in the form of a biconcave lens of negative optical power. The single lens L6 in the form of a biconcave lens of negative optical power is formed as a lens doublet with the biconvex single lens L7 of positive optical power.

The subgroup G4 of the back group HG has positive total optical power and consists of at least a last-but-one single lens with positive optical power and a last single lens with negative optical power, the first surface of which is arranged concavely with respect to the subgroup G3. In the exemplary embodiment, the subgroup G4 consists of a meniscus-shaped convex-concave single lens L8 of negative optical power, a biconvex single lens L9 of positive optical power, and a meniscus-shaped concave-convex single lens L10 of negative optical power, which are combined to form a lens triplet.

The focal length $f'_{G3}$ of the subgroup G3 is advantageously defined by $$f'_{G3}/f'_{ges}=-0.5,$$

while the focal length $f'_{G4}$ of the subgroup G4 is advantageously chosen as $$f'_{G4}/f'_{ges}=+0.5.$$

Advantageously, a compensation for the monochromatic aberrations between the image center and the image field can be achieved using the features of the subgroups G3 and G4.

Advantageously, the refractive index n of at least one of the single lenses of positive optical power in the front group VG has a value greater than or equal to 1.85 ($n\ge1.85$); the Petzval sum is minimized with $n=1.96$.

An advantageously chosen Abbe number v greater than or equal to 60 ($v\ge60$) and in particular equal to 68 ($v=68$) for at least one of the single lenses of positive optical power in the front group VG serves to compensate for, or minimize, chromatic aberrations.

Further advantageously, the refractive index n of at least one of the single lenses of negative optical power in the front group VG is chosen to be less than or equal to 1.75 (n≤1.75); the Petzval sum is further minimized with n=1.73.

A light focusing group MG is advantageous for a high focusing speed. In this case, a ratio of the volume V of the focusing group MG to the image circle diameter Bd in the imaging plane, raised to the third power, of less than 0.1 ($V/Bd^3<0.1$) was found to be particularly advantageous. In this way, the focusing group is light and allows for quick focusing. At the same time, a lightweight focusing group has the advantage of low power consumption in autofocus applications and enables quiet focusing. The image circle diameter Bd is also known to those skilled in the art as the image diagonal of a digital image recording sensor Bs and is described in more detail below with reference to FIG. 10.

Further advantageously, the ratio of the optical overall length SO' of the lens to the image circle diameter Bd in the imaging plane IM is less than or equal to 3.0 (SO'/Bd≤3.0) for a compact design, with the optical overall length SO' being defined as the distance from the lens vertex of the first lens surface of the single lens L1 on the optical axis in the light direction to the image position IM in the imaging plane.

The construction data are normalized to a total focal length $f'_{ges}=1$ mm and can be scaled in a known way, for example to the total focal length $f'_{ges}=100$ mm for the 35 mm range.

Here, the data refer to the surfaces of the lens elements, numbered in ascending order in the light direction. The first surface 1 describes the air-glass transition at single lens L1 and the last surface 18 the glass-air transition at single lens L10. The aperture stop BL is indicated as a planar surface 9.

The vertex radius r, that is to say the radius on the optical axis, is specified for each surface. The surface type is given in the third column. For example, K07 labels the seventh surface as an aspherically curved surface and H08 labels the eighth surface as a diffractive surface. dM denotes the center thickness of the respective single lens or the distance to an adjacent surface at the vertex. For the middle group MG, which is designed to be displaceable for focusing purposes, the value dM is given as the distance in the focusing position for infinity, and V01 and V02 label the distances that are variable with the focusing.

ne denotes the refractive index for the Fraunhofer e-line (wavelength 546.0740 nm) and ve the Abbe number for the Fraunhofer e-line.

The assignment of the numbered surfaces to the respective single lenses L1-L10, the subgroups G1-G4, and the groups VG, MG and HG is given in the last three columns:

| Surface | r [mm] | | $d_M$ [mm] | | ne | ve | Lens | Subgroup | Group |
|---|---|---|---|---|---|---|---|---|---|
| 1 | 0.666 | | 0.05 | | 1.961 | 32 | L1 | G1 | VG |
| 2 | 2.125 | | 0.01 | | | | | | |
| 3 | 0.316 | | 0.09 | | 1.595 | 68 | L2 | | |
| 4 | 0.752 | | 0.04 | | | | | | |
| 5 | 0.794 | | 0.01 | | 1.734 | 28 | L3 | | |
| 6 | 0.231 | | 0.16 | V01 | | | | | |
| 7 | 0.450 | K07 | 0.03 | | 1.747 | 49 | L4 | G2 | MG |
| 8 | 1.013 | H08 | 0.02 | V02 | | | | | |
| 9 | Planar | Stop | 0.02 | | | | | | |
| 10 | −1.173 | | 0.01 | | 1.855 | 24 | L5 | G3 | HG |
| 11 | 0.407 | | 0.07 | | | | | | |
| 12 | −2.117 | | 0.01 | | 1.662 | 51 | L6/7 | | |
| 13 | 0.281 | | 0.07 | | 1.767 | 40 | | | |
| 14 | −1.367 | | 0.01 | | | | | | |
| 15 | 0.747 | | 0.01 | | 1.816 | 23 | L8/9/10 | G4 | |
| 16 | 0.271 | | 0.12 | | 1.704 | 30 | | | |
| 17 | −0.360 | | 0.01 | | 1.489 | 70 | | | |
| 18 | −1.106 | | 0.47 | | | | | | |

A lens constructed using the features described above advantageously has a half object angle w in the range between 10° and 18° (10°≤w≤18°).

The lens has an aperture ratio F/# of at least 1.7 and at most 2.5 (1.7≤F/#≤2.5°).

The lens shown in FIG. 7 has a particularly compact design by virtue of the ratio of the optical overall length SO' of the lens to the image circle diameter Bd in the imaging plane IM being 2.77 (SO'/Bd=2.77), the half object angle w equaling 12° (w=12°), and the aperture ratio F/# being 2.0 (F/#=2.0).

A ratio of the volume V of the focusing group MG to the image circle diameter Bd in the imaging plane, raised to the third power, of 0.02 ($V/Bd^3=0.02$) was found to be particularly advantageous for high focusing speeds in autofocus applications.

For the exemplary embodiment in FIG. 7, mechanical construction data and optical parameters for the respective lens elements are given in the following tables.

The table below shows the conic constant k and the aspherical coefficients a2 to a4 for the aspherical surfaces labeled with K above in relation to the surface type and the phase coefficient C1 for the diffractive surface marked with H08, in exponential representation:

| | k | a2 | a3 | a4 |
|---|---|---|---|---|
| K07 | 0.000000E+00 | 2.314697E−01 | 2.394191E−01 | 1.779782E+02 |
| | C1 | C2 | C3 | C4 |
| H08 | −2.996823E−02 | | | |

Figure 8:
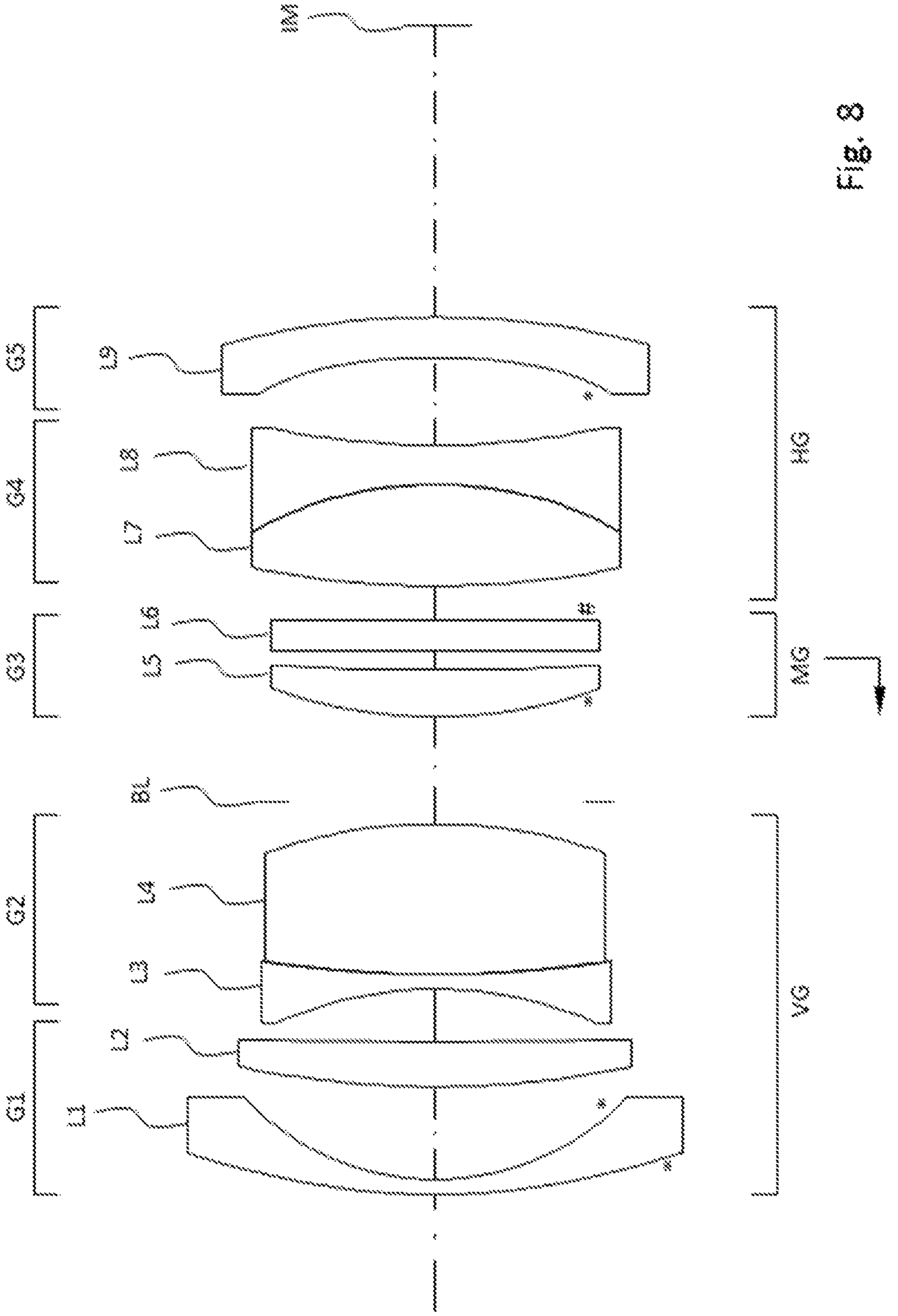
FIG. 8 schematically shows an eighth embodiment of a fixed focal length lens according to the invention.
Figure 9:
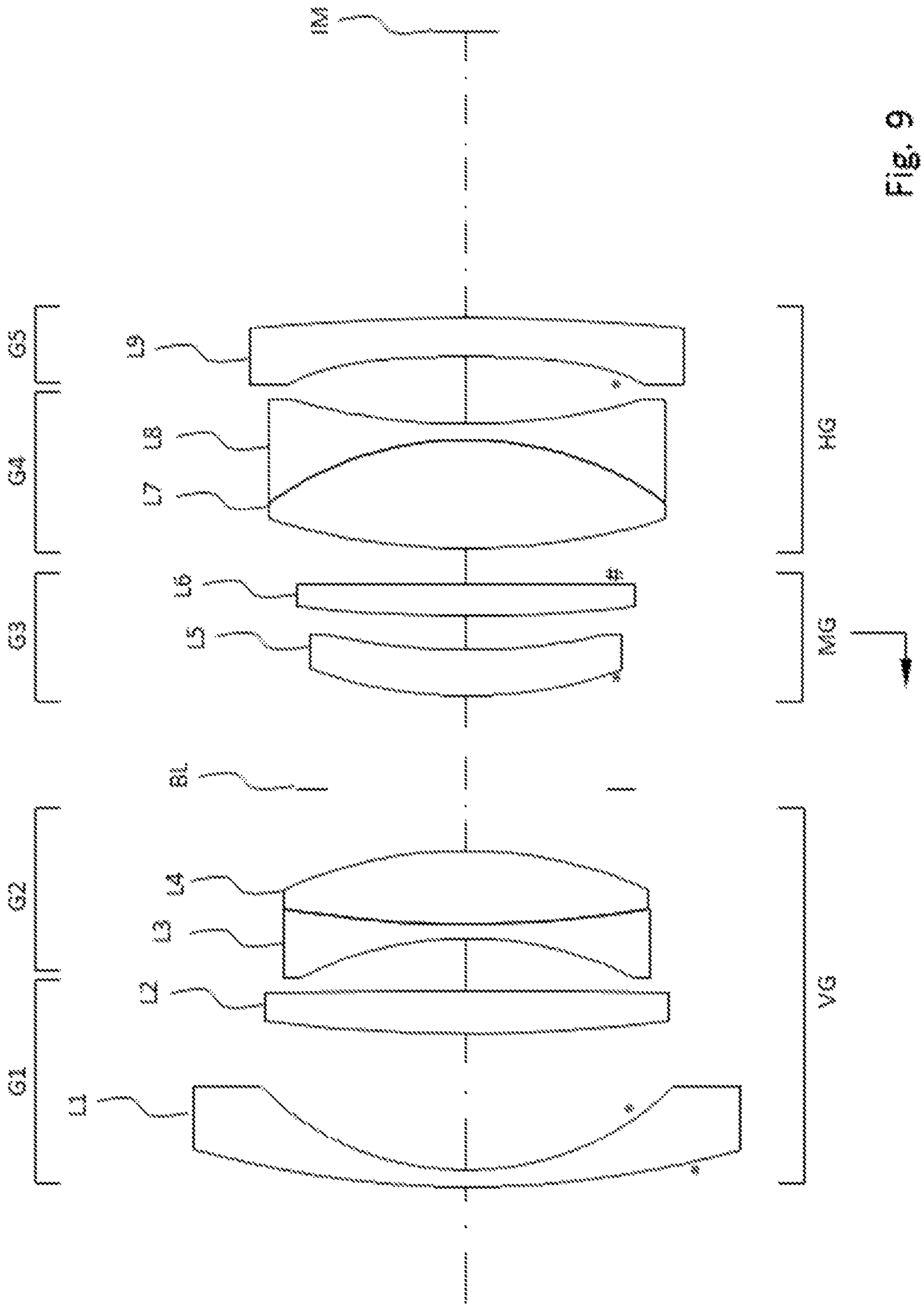
FIG. 9 schematically shows a ninth embodiment of a fixed focal length lens according to the invention.

The exemplary embodiments of a fixed focal length lens shown in FIGS. 8 and 9 consists of three optical assemblies, a front group VG, a middle group MG, and a back group HG, each with positive total optical power, which are arranged upstream of an image position IM as seen in the light direction.

The lens has a normalized total focal length $f'_{ges}$=1 mm and can be scaled in a known way, for example to the total focal length $f'_{ges}$=28 mm for the 35 mm range.

For a standardized representation, the following numerical values are given by focal length ratios.

The focal length $f'_{VG}$ of the front group VG is defined by the range $$+7.0 \leq f'_{VG}/f'_{ges} \leq +25.7,$$

the focal length $f'_{MG}$ of the middle group is in the range $$+1.6 \leq f'_{MG}/f'_{ges} \leq +3.0,$$

and the focal length $f'_{HG}$ of the back group HG is in the range of $$+3.1 \leq f'_{HG}/f'_{ges} \leq +5.0.$$

The front group VG consists of two subgroups G1 and G2, the middle group MG consists of an optical element G3, and the back group HG has two subgroups G4 and G5. An aperture stop BL with a changeable aperture diameter is arranged between the front group VG and the middle group MG. By definition, the middle group MG is arranged in the vicinity of the stop, that is to say no further optical element is provided between the aperture stop BL and the middle group MG. The middle group MG consists of an optical subgroup G3 and is mounted to be movable, in the direction toward the aperture stop BL, for focusing purposes from the depicted infinity position to a near-focus region counter to the light direction (that is to say in the direction of the arrow shown).

Advantageously, the optical power $f'_{MG}$ of the middle group MG should, firstly, not be chosen too small because otherwise the focus travel, from focusing at infinity to focusing close-up, will be longer but, secondly, the optical power must not be chosen too large as the volume of the lens will otherwise increase. Both effects have a disadvantageous effect and would result in the lens focusing too slowly and no longer being suitable for autofocus applications.

According to the invention, therefore, the focal length $f'_{MG}$ of the middle group MG should be chosen in the following range:

$$+1.6 \leq f'_{MG}/f'_{ges} \leq +3.0.$$

In particularly advantageous fashion, the optical element G3 in the middle group MG is designed as a single lens L5 with positive refractive power and as a single lens L6 with, on one side, a surface of diffractive optical power $f'_{DOE}$ within the limits:

$$+33.6 \leq f'_{DOE}/f'_{ges} \leq +45.4$$

in order to minimize the chromatic aberration over the entire distance setting range of the lens.

According to the invention, the simple manufacture of the diffractive structure required for the diffractive optical power is made possible on a flat, at least only slightly curved surface of one of the single lenses of the middle group MG. Advantageously, therefore, the vertex radius roof of the diffractive surface of this single lens in the middle group MG is planar within the following limits:

$$-0.1255 \leq f'_{MG}/r_{DOE} \leq +0.1388.$$

Compensation for the monochromatic aberrations over the distance setting range is advantageously ensured if the aperture stop BL facing surface of the single lens of the middle group MG has a positive optical power and is further advantageously designed to be aspherical.

The subgroup G1 of the front group VG consists of two members L1 and L2 and has an overall negative optical power. The focal length $f'_{G1}$ of the subgroup G1 is defined by the following range:

$$f'_{G1}/f'_{ges} \leq -3.7.$$

The at least one convex-concave first single lens L1 with negative optical power is meniscus-shaped and arranged with its concave side toward a convex side of the at least one single lens L2 with positive optical power.

The subgroup G2 of the front group VG has two members L3 and L4 with an overall positive optical power. The at least one first single lens L3 with negative optical power is of biconcave form and arranged with its concave first side toward the single lens L2 in the subgroup G1. The second element of subgroup G2 has at least one single lens L4 of positive optical power. In the exemplary embodiment, the members L3 and L4 are designed as individual lens elements and combined as a doublet.

The features of the subgroups G1 and G2 advantageously bring about a compensation of the monochromatic aberrations between the image center and the image field.

The subgroup G4 of the back group HG has two members L7 and L8 with an overall positive optical power. It consists of at least one biconvex single lens L7 with positive optical power and at least one biconcave single lens L8 with negative optical power. L7 is arranged with its convex first side facing the middle group MG. In the exemplary embodiment, the members L7 and L8 are designed as individual lens elements and combined as a doublet.

The subgroup G5 of the back group HG has negative or positive total optical power and consists of at least one last single lens L9 whose first surface is of concave form and arranged facing the subgroup G4. In this case, the focal length $f'_{G5}$ of subgroup G5 is defined by the range $-0.1 \leq f'_{ges}/f'_{G5} \leq +0.1$.

Advantageously, the features of the subgroups G4 and G5 can be used to bring about a minimization of the coma, the astigmatic difference and the distortion in the image field.

Advantageously, the refractive index n of at least one of the single lenses of positive optical power in the front group VG has a value greater than or equal to 1.85 ($n \geq 1.85$); the Petzval sum is minimized in this way.

Further advantageously, the refractive index n of at least one of the single lenses of positive optical power in the back group HG is likewise chosen to be greater than or equal to 1.85 ($n \geq 1.85$) in order to further minimize the Petzval sum.

An advantageously chosen refractive index n of less than or equal to 1.60 ($n \leq 1.60$) of the first single lens of negative optical power in the front group VG also contributes to minimizing the Petzval sum.

To compensate for the monochromatic aberrations in the image field, the first single lens L1 in the front group VG is formed with aspherical surfaces on one or both sides.

Advantageously, the last single lens L9 in the back group HG is formed with aspherical surfaces on one or both sides in order to achieve further compensation for the monochromatic aberrations in the image field.

A light focusing group MG is advantageous for a high focusing speed. In this case, a ratio of the volume V of the focusing group MG to the image circle diameter Bd in the imaging plane, raised to the third power, of less than 0.1 ($V/Bd^3<0.1$) was found to be particularly advantageous. In this way, the focusing group is light and allows for quick focusing. At the same time, a lightweight focusing group has the advantage of low power consumption in autofocus applications and enables quiet focusing. The image circle diameter Bd is also known to those skilled in the art as the image diagonal of a digital image recording sensor Bs and is described in more detail below with reference to FIG. 10.

Further advantageously, the ratio of the optical overall length SO' of the lens to the image circle diameter Bd in the imaging plane IM is less than or equal to 2.0 (SO'/Bd≤2.0) for a compact design, with the optical overall length SO' being defined as the distance from the lens vertex of the first lens surface of the single lens L1 on the optical axis in the light direction to the image position IM in the imaging plane.

A lens constructed using the features described above advantageously has a half object angle w of greater than or equal to 31° (w≥31°).

The lens has an aperture ratio F/# of at least 1.7 and at most 2.5, it is advantageously in the range between 1.7 and 2.5 (1.7≤F/#≤2.5).

The lens shown in FIG. 8 has a compact design, with the ratio of the optical overall length SO' of the lens to the image circle diameter Bd in the imaging plane IM being 1.73 (SO'/Bd=1.73), the half object angle w equaling 42° (w=42°), and the aperture ratio F/# being 2.0 (F/#=2.0).

In this lens, the previously described subgroups G1 to G5 consist of single lenses L1 to L9, which, as seen in the light direction, have the optical power sequence −+−++0+−− (0=neutral, planar, no refractive optical power).

The focal length $f'_{VG}$ of the front group VG is particularly advantageously defined by $$f'_{VG}/f'_{ges} ≤ +8.7,$$

the focal length $f'_{MG}$ of the middle group MG is particularly advantageously defined by $$f'_{MG}/f'_{ges} = +2.6,$$

and the focal length $f'_{HG}$ of the back group HG is particularly advantageously defined by $$f'_{HG}/f'_{ges} = +3.5,$$

in each case related to a given total focal length $f'_{ges}$ of the lens.

The single lens L5 of the optical element G3 in the middle group MG arranged downstream of the stop BL is in the form of a convex lens with an aspherical first surface, as seen in the light direction. The second surface can be embodied to be planar or concave.

The single lens L6, embodied as an optically transparent plane plate in the exemplary embodiment, has a diffractive optical power $f'_{DOE}$ of $$f'_{DOE}/f'_{ges} = +36.5$$

on its side facing the image position IM, which particularly advantageously brings about the minimization of the chromatic aberration over the entire distance setting range of the lens. An optically transparent plane plate is particularly suitable for the simple production of a diffractive structure. The aspherical first surface of single lens L5 compensates for monochromatic aberrations over the distance setting range.

The subgroup G1 of the front group VG consists of two single lenses L1 and L2 and has an overall focal length $F'_{G1}$ of $$f'_{G1}/f'_{ges} = −10.0.$$

The first single lens L1 has a convex-concave shape with negative optical power and is meniscus-shaped with an aspherically curved convex side and an aspherically curved concave side.

The subgroup G2 of the front group VG advantageously has an overall focal length $f'_{G2}$ of $$f'_{G2}/f'_{ges} = +5.6.$$

With the focal lengths defined in this way for the subgroups G1 and G2, compensation for the monochromatic aberrations between the image center and the image field is ensured.

The subgroup G4 of the back group HG consists of a biconvex single lens L7 and a biconcave single lens L8, both are combined in a doublet, with a total focal length $f'_{G4}$ of $$f'_{G4}/f'_{ges} = +2.9.$$

Advantageously, the subgroup G5 of the back group HG has an overall focal length $f'_{G5}$ of $$f'_{G5}/f'_{ges} = +0.056.$$

and is embodied as an individual lens L9 with a concave-convex lens shape. The first concave side of the single lens L9 in the light direction is shaped aspherically.

By way of the focal lengths defined in this way for the subgroups G4 and G5, the coma, the astigmatic difference, and the distortion in the image field are further minimized.

Advantageously, the single lens L2 in the front group VG and the single lens L7 in the back group HG have the same refractive index. The use of the same glass material for both lens elements lends itself to this embodiment, in order to thus make production easier and reduce storage costs. L2 and L7 particularly preferably have a refractive index of 2.01 (n=2.01) and the single lens L1 in the front group VG has a refractive index of 1.49 (n=1.49) in order to further minimize the Petzval sum.

A ratio of the volume V of the focusing group MG to the image circle diameter Bd in the imaging plane, raised to the third power, of 0.04 (V/Bd³=0.04) was found to be particularly advantageous for high focusing speeds in autofocus applications.

For the exemplary embodiment in FIG. 8, mechanical construction data and optical parameters for the respective lens elements are given in the following tables.

The construction data are normalized to a total focal length $f'_{ges}=1$ mm and can be scaled in a known way, for example to the total focal length $f'_{ges}=28$ mm for the 35 mm range.

Here, the data refer to the surfaces of the lens elements, numbered in ascending order in the light direction. The first surface 1 describes the air-glass transition at single lens L1 and the last surface 17 the glass-air transition at single lens L9. The aperture stop BL is indicated as a planar surface 8.

The vertex radius r, that is to say the radius on the optical axis, is specified for each surface. The surface type is given in the third column. For example, K01 labels the first surface as an aspherically curved surface and H12 labels the twelfth surface as a diffractive surface. dM denotes the center thickness of the respective single lens or the distance to an adjacent surface at the vertex. For the middle group MG, which is designed to be displaceable for focusing purposes, the value dM is given as the distance in the focusing position for infinity, and V01 and V02 label the distances that are variable with the focusing.

ne denotes the refractive index for the Fraunhofer e-line (wavelength 546.0740 nm) and ve the Abbe number for the Fraunhofer e-line.

The assignment of the numbered surfaces to the respective single lenses L1-L9, the subgroups G1-G5, and the groups VG, MG and HG is given in the last three columns:

| Surface | r [mm] | | $d_M$ [mm] | | ne | ve | Lens | Subgroup | Group |
|---|---|---|---|---|---|---|---|---|---|
| 1 | 1.454 | K01 | 0.04 | | 1.489 | 70 | L1 | G1 | VG |
| 2 | 0.558 | K02 | 0.21 | | | | | | |
| 3 | 2.156 | | 0.10 | | 2.009 | 29 | L2 | | |
| 4 | 13.237 | | 0.12 | | | | | | |
| 5 | −0.850 | | 0.04 | | 1.704 | 30 | L3/4 | G2 | |
| 6 | 2.451 | | 0.34 | | 1.888 | 41 | | | |
| 7 | −1.100 | | 0.05 | | | | | | |
| 8 | Planar | Stop | 0.19 | V01 | | | | | |
| 9 | 1.088 | K09 | 0.11 | | 1.489 | 70 | L5 | G3 | MG |
| 10 | 7.668 | | 0.04 | | | | | | |
| 11 | Planar | | 0.07 | | 1.694 | 31 | L6 | | |
| 12 | Planar | H12 | 0.07 | V02 | | | | | |
| 13 | 1.881 | | 0.24 | | 2.009 | 29 | L7/8 | G4 | HG |
| 14 | −0.776 | | 0.09 | | 1.816 | 23 | | | |
| 15 | 1.719 | | 0.20 | | | | | | |
| 16 | −1.527 | K16 | 0.09 | | 1.697 | 53 | L9 | G5 | |
| 17 | −1.785 | | 0.66 | | | | | | |

The table below shows the conic constant k and the aspherical coefficients a2 to a6 for the aspherical surfaces labeled with K above in relation to the surface type and the phase coefficient C1 for the diffractive surface marked with H12, in exponential representation:

| | k | a2 | a3 | a4 |
|---|---|---|---|---|
| K01 | 0.000000E+00 | −1.084902E−01 | | |
| K02 | 0.000000E+00 | −7.014032E−02 | −4.914109E−02 | 1.770390E+00 |
| K09 | 0.000000E+00 | 1.337399E−01 | 3.345997E−01 | −8.064074E−01 |
| K16 | 0.000000E+00 | −1.122549E+00 | 8.788157E−01 | −3.332940E+01 |

| | | a5 | a6 | |
|---|---|---|---|---|
| K01 | | | | |
| K02 | | −2.229924E+01 | 9.405315E+01 | |
| K09 | | | | |
| K16 | | 1.561304E+02 | −4.509463E+02 | |

| | C1 | C2 | C3 | C4 |
|---|---|---|---|---|
| H12 | −1.369910E−02 | | | |

The lens shown in FIG. 9 has a compact design, with the ratio of the optical overall length SO' of the lens to the image circle diameter Bd in the imaging plane IM being 1.73 (SO'/Bd=1.73), the half object angle w equaling 42° (w=42°), and the aperture ratio F/# being 2.0 (F/#=2.0).

In this lens, the previously described subgroups G1 to G5 consist of single lenses L1 to L9, which, as seen in the light direction, have the optical power sequence −+−++++−−.

The focal length $f'_{VG}$ of the front group VG is particularly advantageously defined by $$f'_{VG}/f'_{ges}=+7.5,$$

the focal length $f'_{MG}$ of the middle group MG is particularly advantageously defined by $$f'_{MG}/f'_{ges}=+2.8,$$

and the focal length $f'_{HG}$ of the back group HG is particularly advantageously defined by $$f'_{HG}/f'_{ges}=+3.0,$$

in each case related to a given total focal length $f'_{ges}$ of the lens.

The single lens L5 of the optical element G3 in the middle group MG arranged downstream of the stop BL is in the form of a convex-concave lens with an aspherical first surface, as seen in the light direction.

The convex-shaped single lens L6 shown in the exemplary embodiment has a diffractive optical power $f'_{DOE}$ of $$f'_{DOE}/f'_{ges}=+35.9$$

on its side facing the image position IM, which particularly advantageously brings about the minimization of the chromatic aberration over the entire distance setting range of the lens. For a particularly simple production of a diffractive structure, the second surface of the single lens L6 in the light direction is in the form of a plane surface. The aspherical first surface of single lens L5 compensates for monochromatic aberrations over the distance setting range.

The subgroup G1 of the front group VG consists of two single lenses L1 and L2 and has an overall focal length $f'_{G1}$ of $$f'_{G1}/f'_{ges}=-9.7.$$

The first single lens L1 has a convex-concave shape with negative optical power and is meniscus-shaped with an aspherically curved convex side and an aspherically curved concave side.

The subgroup G2 of the front group VG advantageously has an overall focal length $f'_{G2}$ of $$f'_{G2}/f'_{ges}=+5.3.$$

With the focal lengths defined in this way for the subgroups G1 and G2, compensation for the monochromatic aberrations between the image center and the image field is ensured.

The subgroup G4 of the back group HG consists of a biconvex single lens L7 and a biconcave single lens L8, combined in a doublet, with a total focal length $f'_{G4}$ of $$f'_{G4}/f'_{ges}=+2.5.$$

Advantageously, the subgroup G5 of the back group HG has an overall focal length $f'_{G5}$ of $$f'_{G5}/f'_{ges}=+0.086$$

and is embodied as an individual lens L9 with a concave-convex lens shape. The first concave side of the single lens L9 in the light direction is shaped aspherically.

By way of the focal lengths defined in this way for the subgroups G4 and G5, the coma, the astigmatic difference, and the distortion in the image field are further minimized.

Advantageously, the single lens L2 in the front group VG and the single lens L7 in the back group HG have the same refractive index. The use of the same glass material for both lens elements lends itself to this embodiment, in order to thus make production easier and reduce storage costs. L2 and L7 preferably have a refractive index of 2.01 (n=2.01) and the single lens L1 in the front group VG has a refractive index of 1.49 (n=1.49) in order to further minimize the Petzval sum.

A ratio of the volume V of the focusing group MG to the image circle diameter Bd in the imaging plane, raised to the third power, of 0.05 ($V/Bd^3=0.05$) was found to be particularly advantageous for high focusing speeds in autofocus applications.

For the exemplary embodiment in FIG. 9, mechanical construction data and optical parameters for the respective lens elements are given in the following tables.

The construction data are normalized to a total focal length $f'_{ges}=1$ mm and can be scaled in a known way, for example to the total focal length $f'_{ges}=28$ mm for the 35 mm range.

Here, the data refer to the surfaces of the lens elements, numbered in ascending order in the light direction. The first surface 1 describes the air-glass transition at single lens L1 and the last surface 17 the glass-air transition at single lens L9. The aperture stop BL is indicated as a planar surface 8.

The vertex radius r, that is to say the radius on the optical axis, is specified for each surface. The surface type is given in the third column. For example, K01 labels the first surface as an aspherically curved surface and H12 labels the twelfth surface as a diffractive surface. dM denotes the center thickness of the respective single lens or the distance to an adjacent surface at the vertex. For the middle group MG, which is designed to be displaceable for focusing purposes, the value dM is given as the distance in the focusing position for infinity, and V01 and V02 label the distances that are variable with the focusing.

ne denotes the refractive index for the Fraunhofer e-line (wavelength 546.0740 nm) and ve the Abbe number for the Fraunhofer e-line.

The assignment of the numbered surfaces to the respective single lenses L1-L9, the subgroups G1-G5, and the groups VG, MG and HG is given in the last three columns:

| Surface | r [mm] | | $d_M$ [mm] | | ne | ve | Lens | Subgroup | Group |
|---|---|---|---|---|---|---|---|---|---|
| 1 | 2.108 | K01 | 0.04 | | 1.489 | 70 | L1 | G1 | VG |
| 2 | 0.661 | K02 | 0.32 | | | | | | |
| 3 | 3.600 | | 0.10 | | 2.009 | 29 | L2 | | |
| 4 | −14.938 | | 0.12 | | | | | | |
| 5 | −0.810 | | 0.03 | | 1.704 | 30 | L3/4 | G2 | |
| 6 | 2.325 | | 0.17 | | 1.888 | 41 | | | |
| 7 | −0.986 | | 0.14 | | | | | | |
| 8 | Planar | Stop | 0.22 | V01 | | | | | |
| 9 | 0.963 | K09 | 0.11 | | 1.489 | 70 | L5 | G3 | MG |
| 10 | 1.381 | | 0.08 | | | | | | |
| 11 | 3.577 | | 0.07 | | 1.694 | 31 | L6 | | |
| 12 | Planar | H12 | 0.09 | V02 | | | | | |
| 13 | 1.468 | | 0.25 | | 2.009 | 29 | L7/8 | G4 | HG |
| 14 | −0.738 | | 0.04 | | 1.816 | 23 | | | |
| 15 | 1.401 | | 0.16 | | | | | | |
| 16 | −2.842 | K16 | 0.09 | | 1.697 | 53 | L9 | G5 | |
| 17 | −4.428 | | 0.67 | | | | | | |

The table below shows the conic constant k and the aspherical coefficients a2 to a6 for the aspherical surfaces labeled with K above in relation to the surface type and the phase coefficient C1 for the diffractive surface marked with H12, in exponential representation:

| | k | a2 | a3 | a4 |
|---|---|---|---|---|
| K01 | 0.000000E+00 | −4.432677E−02 | | |
| K02 | 0.000000E+00 | 1.097938E−01 | −2.915075E−01 | 6.657444E+00 |
| K09 | 0.000000E+00 | 7.816568E−02 | 3.717280E−02 | −1.842303E−01 |
| K16 | 0.000000E+00 | −1.043570E+00 | 2.017455E−01 | −2.088531E+01 |

| | a5 | a6 |
|---|---|---|
| K01 | | |
| K02 | −3.354089E+01 | 8.543317E+01 |
| K09 | | |
| K16 | 8.095942E+01 | −2.228453E+02 |

| | C1 | C2 | C3 | C4 |
|---|---|---|---|---|
| H12 | −1.393289E−02 | | | |

Figure 10:
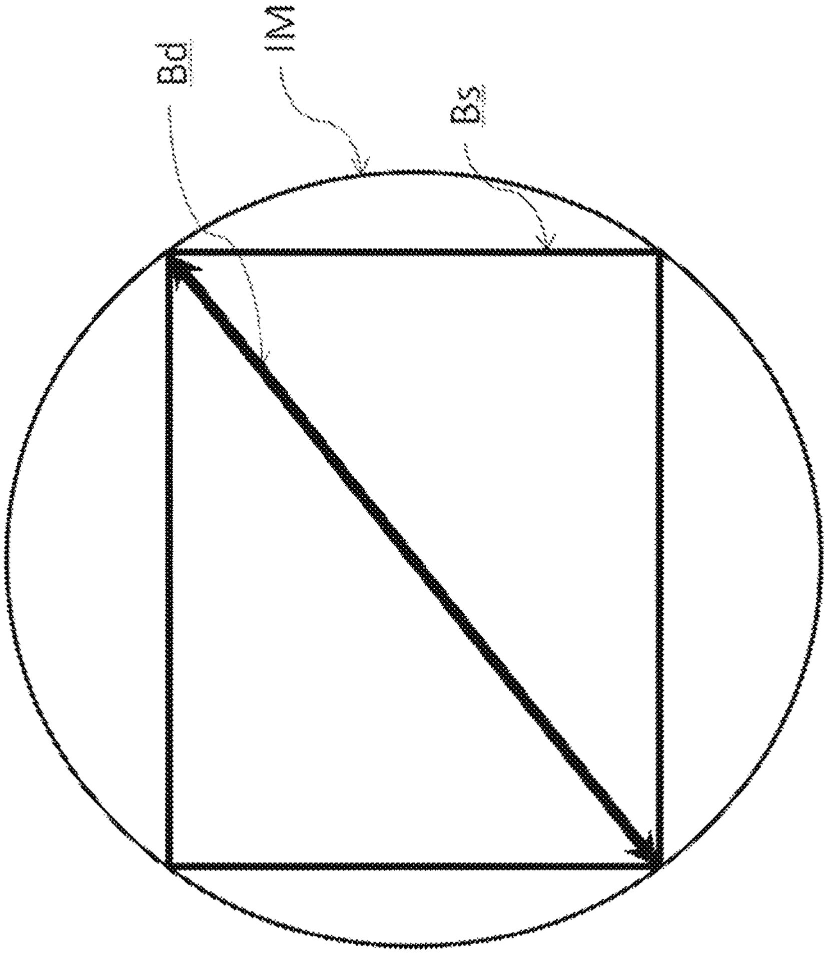
FIG. 10 shows a diagram demonstrating an image circle diameter Bd as the image diagonal of a digital image recording sensor Bs.

FIG. 10 schematically depicts a circular imaging plane IM in the image position. The image circle diameter Bd, which corresponds to the diameter of an image sensor Bs shown as a rectangle, is shown using a double-headed arrow.

REFERENCE LIST

BL Aperture stop
L1-L10 First to tenth lens
G1-G5 First to fifth subgroup
VG Front group
MG Middle group
HG Back group
Bd Image circle diameter
IM Imaging plane/image position
* Aspherically curved lens surface
Surface of diffractive optical power

The invention claimed is:

1. A fixed focal length lens comprising, in the light direction, a fixed front lens group (VG), a fixed stop (BL) with an adjustable aperture, a fixed back lens group (HG), and a focusing group (MG) positioned between the fixed front lens group (VG) and the fixed back lens group (HG), wherein said focusing group (MG) can be displaced relative to the stop along the optical axis of the lens for the purpose of imaging differently distant objects on a fixed image plane (IM), wherein the focusing group (MG) consists of at least a lens element and a diffractive optical element (DOE) integrated into the focusing group (MG); and the focusing group (MG) consists of a maximum of two lens elements and has a positive optical power $f'_{MG}$ overall; wherein the ratio V of the volume of the focusing group (MG) to the image circle diameter (Bd) in an imaging plane (IM), raised to the third power, is less than 0.1 ($V/Bd^3<0.1$).

2. The lens as claimed in claim 1, wherein a ratio of the optical power $f'_{DOE}$ of the diffractive optical element (DOE) to the total optical power $f'_{ges}$ of the fixed focal length lens is at least 14.9 and at most 45.4.

3. The lens as claimed in claim 1, wherein the ratio of a total optical power $f'_{MG}$ of the focusing group (MG) to a total optical power $f'_{ges}$ of the fixed focal length lens is at least 0.9 and at most 3.0, with the focusing group (MG) consisting of a single lens element with an aspherically convex front surface in the light direction and a virtually flat back surface having a vertex radius $r_{DOE}$, with the ratio of a total optical power $f'_{MG}$ of the focusing group (MG) to the vertex radius $r_{DOE}$ being at least −0.1255 and at most 0.1388, and the diffractive optical element (DOE) being applied to a virtually planar back surface.

4. The lens as claimed in claim 3, wherein the focusing group (MG) consists of a single lens element with, in the light direction, an aspherically convex front surface and a planar flat back surface to which the diffractive optical element (DOE) has been applied.

5. The lens as claimed in claim 1, wherein a ratio of the total optical power $f'_{MG}$ of the focusing group (MG) to a total optical power $f'_{ges}$ of the fixed focal length lens is at least 0.5 and at most 1.0, with the focusing group (MG) consisting of a single lens element with an aspherically convex front surface in the light direction and the back surface having a weakly curved vertex radius $r_{DOE}$, which is at least greater than or equal to 3.159 mm in the case of a total optical power $f'_{ges}$ of the fixed focal length lens normalized to 1 mm, but at least greater than or equal to 1.013 mm, and the diffractive optical element (DOE) being applied to the thus weakly curved back surface.

6. The lens as claimed in claim 1, wherein the focusing group (MG) consists of a first lens element (L5) succeeded by a second lens element (L6) in the light direction downstream of the stop (BL), the first lens element (L5) of which has an aspherically convex front surface, and the diffractive optical element (DOE) is applied to a planar back surface of the second lens element (L6).

7. The lens as claimed in claim 6, wherein the first lens element (L5) has a concave back surface and the second lens element (L6) has a convex front surface.

8. The lens as claimed in claim 1, wherein the focusing group (MG) is movable from a position with focusing on an infinitely distant object point to a close-up focus counter to the light direction, away from the back lens group (HG) and toward the front lens group (VG).

9. The lens as claimed in claim 8, wherein the focusing group (MG) is arranged in a vicinity of the stop, in front of or behind the stop (BL), with no further optical element, at most one further optical element, being arranged between the focusing group (MG) and stop (BL).

10. The lens as claimed in claim 1, wherein a first single lens (L1) in the front group (VG) is formed with aspherical surfaces on one or both sides.

11. The lens as claimed in claim 1, wherein a last single lens (L7, L8, L9) in the back group (HG) is formed with aspherical surfaces on one or both sides.

12. The lens as claimed in claim 1, wherein the front lens group (VG) has positive optical power.

13. A fixed focal length lens comprising, in the light direction, a fixed front lens group (VG), a fixed stop (BL) with an adjustable aperture, a fixed back lens group (HG), and a focusing group (MG) positioned between the fixed front lens group (VG) and the fixed back lens group (HG), wherein said focusing group (MG) can be displaced relative to the stop along the optical axis of the lens for the purpose of imaging differently distant objects on a fixed image plane (IM), wherein the focusing group (MG) consists of at least a lens element and a diffractive optical element (DOE) integrated into the focusing group (MG); and the focusing group (MG) consists of a maximum of two lens elements and has a positive optical power $f'_{MG}$ overall; wherein the ratio of the optical overall length (SO') of the lens to the image circle diameter (Bd) in an imaging plane (IM) is less than or equal to 3.0 ($SO'/Bd<=3.0$).

14. The lens as claimed in claim 13, wherein a ratio of the optical power $f'_{DOE}$ of the diffractive optical element (DOE) to the total optical power $f'_{ges}$ of the fixed focal length lens is at least 14.9 and at most 45.4.

15. The lens as claimed in claim 13, wherein the ratio of a total optical power $f'_{MG}$ of the focusing group (MG) to a total optical power $f'_{ges}$ of the fixed focal length lens is at least 0.9 and at most 3.0, with the focusing group (MG) consisting of a single lens element with an aspherically convex front surface in the light direction and the virtually flat back surface having a vertex radius $r_{DOE}$, with the ratio of a total optical power $f'_{MG}$ of the focusing group (MG) to the vertex radius $r_{DOE}$ being at least −0.1255 and at most 0.1388, and the diffractive optical element (DOE) being applied to a virtually planar back surface.

16. The lens as claimed in claim 15, wherein the focusing group (MG) consists of a single lens element with, in the light direction, an aspherically convex front surface and a planar flat back surface to which the diffractive optical element (DOE) has been applied.

17. The lens as claimed in claim 13, wherein a ratio of the total optical power $f'_{MG}$ of the focusing group (MG) to a total optical power $f'_{ges}$ of the fixed focal length lens is at least 0.5 and at most 1.0, with the focusing group (MG) consisting of a single lens element with an aspherically convex front surface in the light direction and the back surface having a weakly curved vertex radius $r_{DOE}$, which is at least greater than or equal to 3.159 mm in the case of a total optical power $f'_{ges}$ of the fixed focal length lens normalized to 1 mm, but at least greater than or equal to 1.013 mm, and the diffractive optical element (DOE) being applied to the thus weakly curved back surface.

18. The lens as claimed in claim 13, wherein the focusing group (MG) consists of a first lens element (L5) succeeded by a second lens element (L6) in the light direction downstream of the stop (BL), the first lens element (L5) of which has an aspherically convex front surface, and the diffractive optical element (DOE) is applied to a planar back surface of the second lens element (L6).

19. The lens as claimed in claim 18, wherein the first lens element (L5) has a concave back surface and the second lens element (L6) has a convex front surface.

20. The lens as claimed in claim 13, wherein the focusing group (MG) is movable from a position with focusing on an infinitely distant object point to a close-up focus counter to the light direction, away from the back lens group (HG) and toward the front lens group (VG).

21. The lens as claimed in claim 20, wherein the focusing group (MG) is arranged in a vicinity of the stop, in front of or behind the stop (BL), with no further optical element, at most one further optical element, being arranged between the focusing group (MG) and stop (BL).

22. The lens as claimed in claim 13, wherein a first single lens (L1) in the front group (VG) is formed with aspherical surfaces on one or both sides.

23. The lens as claimed in claim 13, wherein a last single lens (L7, L8, L9) in the back group (HG) is formed with aspherical surfaces on one or both sides.

24. The lens as claimed in claim 13, wherein the front lens group (VG) has positive optical power.

* * * * *